US009347441B2

(12) United States Patent
Rice et al.

(10) Patent No.: US 9,347,441 B2
(45) Date of Patent: May 24, 2016

(54) COMPRESSORS INCLUDING POLYMERIC COMPONENTS

(71) Applicant: SABIC GLOBAL TECHNOLOGIES B.V., Bergen op Zoom (NL)

(72) Inventors: Brian Jason Rice, Huntersville, NC (US); Marcos Fernando Borges, Campinas (ES); Andrew May, Pittsfield, MA (US); Donald W. DeMello, Austin, TX (US); Haralur Gurulingamurthy, Mt. Vernon, IN (US); Shawn William Lee, Pittsfield, MA (US); Ernest Caldwell, Dunwoody, GA (US); Walter Thompson, Wilmington, DE (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 91 days.

(21) Appl. No.: 13/826,831

(22) Filed: Mar. 14, 2013

(65) Prior Publication Data

US 2014/0010679 A1  Jan. 9, 2014

Related U.S. Application Data

(60) Provisional application No. 61/618,162, filed on Mar. 30, 2012.

(51) Int. Cl.
*F04C 2/02* (2006.01)
*F04B 27/00* (2006.01)
*F04C 18/02* (2006.01)
(Continued)

(52) U.S. Cl.
CPC ............... *F04B 27/00* (2013.01); *F04B 15/04* (2013.01); *F04C 2/025* (2013.01); *F04C 18/0207* (2013.01); *F04C 23/008* (2013.01);
(Continued)

(58) Field of Classification Search
CPC .................... F04C 18/0207–18/0292; F05C 2225/00–2225/12
USPC .......... 417/228; 418/55.1, 55.2, 56, 152, 179; 92/248–254
See application file for complete search history.

(56) References Cited

U.S. PATENT DOCUMENTS 3,659,502 A * 5/1972 Friedman et al. ............... 92/84
5,131,827 A * 7/1992 Tasaka ....................... 418/55.2
(Continued)

FOREIGN PATENT DOCUMENTS

DE 102008024307 1/2009
EP 1701039 A1 9/2006
(Continued)

OTHER PUBLICATIONS

"Ryton® R-4-220 Polyphenylene Sulfide Resins". Technical Specifications. Chevron Phillips Chemical Company LP. Jan. 2014.*
(Continued)

*Primary Examiner* — Jesse Bogue
*Assistant Examiner* — Laert Dounis
(74) *Attorney, Agent, or Firm* — Cantor Colburn LLP

(57) ABSTRACT

Improvements in compressor manufacture are achieved by utilizing polymeric components which retain at least 90% of their dimensions after being exposed to a mixture of refrigerants and/or lubricants for 30 days at 60° C. Polymeric materials include (i) polyetherimides, (ii) polyphenylene sulfides, (iii) polyketones, (iv) polysulfones, (v) liquid crystal polymers, and (vi) combinations thereof. Metal coatings on the polymers are the preferred embodiments for housings.

27 Claims, 16 Drawing Sheets

(51) Int. Cl.
  *F04B 15/04*   (2006.01)
  *F04C 23/00*   (2006.01)

(52) U.S. Cl.
  CPC ......... *F04C2230/24* (2013.01); *F05C 2225/00* (2013.01); *F05C 2253/04* (2013.01)

(56) References Cited

U.S. PATENT DOCUMENTS

| | | | | |
|---|---|---|---|---|
| 5,199,859 | A * | 4/1993 | Kitaichi | 417/410.1 |
| 5,806,336 | A * | 9/1998 | Sunaga et al. | 62/469 |
| 5,992,948 | A * | 11/1999 | Gowda | 303/116.1 |
| 6,001,957 | A * | 12/1999 | Puyenbroek et al. | 528/332 |
| 6,006,542 | A | 12/1999 | Tojo et al. | |
| 2002/0098100 | A1 * | 7/2002 | Mori et al. | 418/55.2 |
| 2012/0090461 | A1 * | 4/2012 | Kita | 92/169.1 |

FOREIGN PATENT DOCUMENTS

| | | |
|---|---|---|
| EP | 1980752 A2 | 10/2008 |
| GB | 2214512 A | 11/1992 |
| JP | 05245966 | 9/1993 |

OTHER PUBLICATIONS

"Defining and Comparing PPS Types". Technical Serve Memorandum. Chevron Phillips Chemical Company LP. Jan. 2003.*
"Polyetherimide Sulfone Resins". IP.com Technical Disclosure Number: 000124462D. Apr. 21, 2005.*
"Polyetherimide Sulfone Resins". IP.com Technical Disclosure Number: 000009849D. Sep. 23, 2002.*
Written Opinion of International Searching Authority Dated Oct. 1, 2014.

* cited by examiner

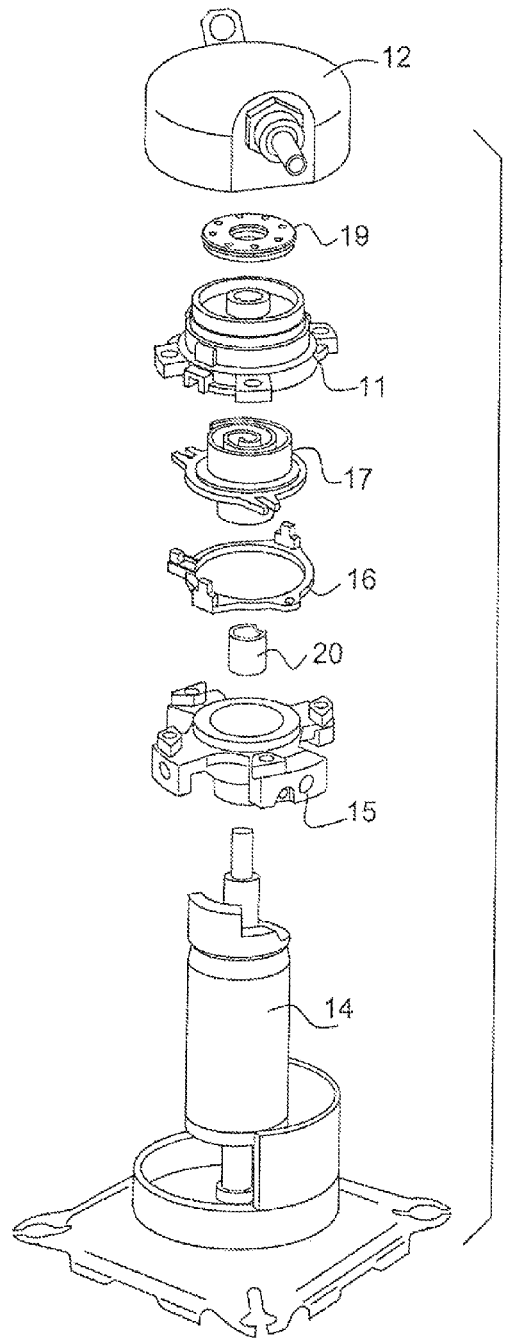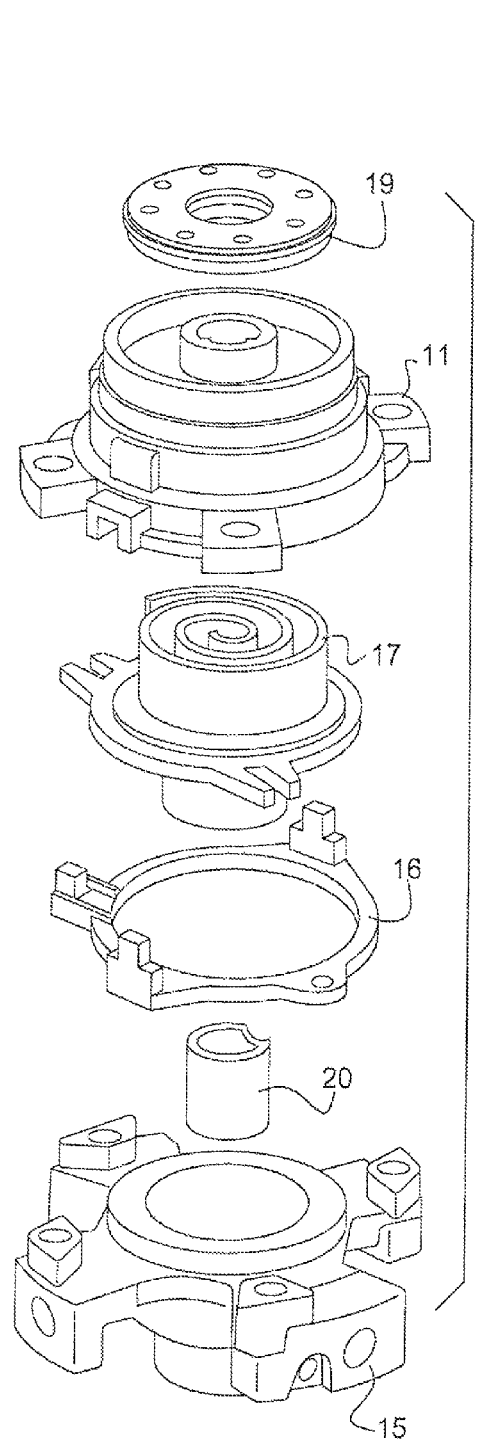
FIG. 3A
(PRIOR ART)
FIG. 3B
(PRIOR ART)

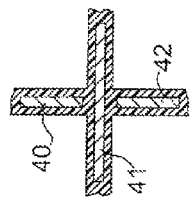
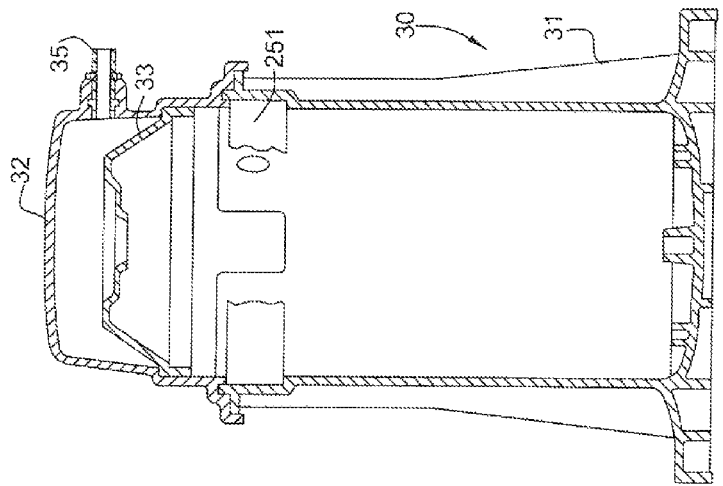
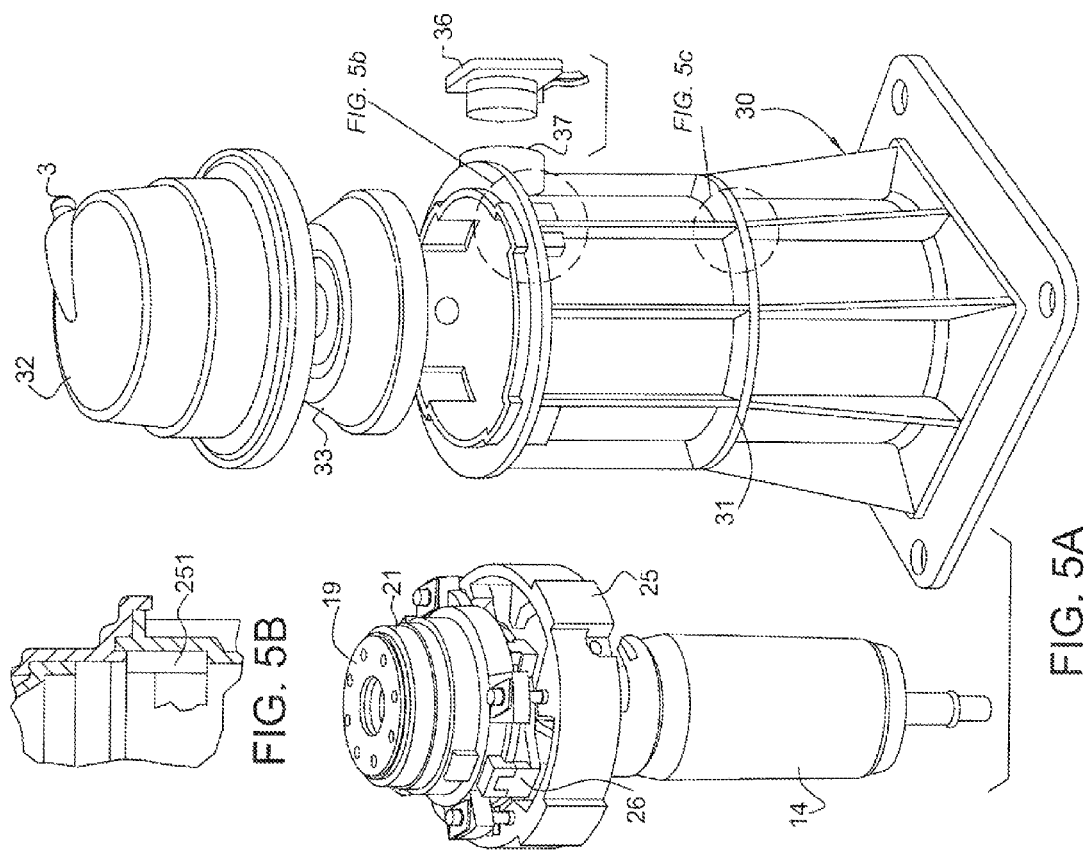

FIG. 11

COMPRESSORS INCLUDING POLYMERIC COMPONENTS

CROSS-REFERENCES TO RELATED APPLICATIONS

This application claims benefit under 35 U.S.C. §119(e) to U.S. Provisional Patent Application Ser. No. 61/618,162 filed on Mar. 30, 2012, which is hereby incorporated by reference in its entirety.

BACKGROUND OF THE INVENTION

1. Field of the Invention

The invention relates generally to compressors including polymeric components and more specifically to compressors selected from the group consisting of: polyetherimides, polyphenylene sulfides, polyketones such as polyaryl ether ketones, polyketones such as polyether ether ketone, polysulfones, liquid crystal polymers, and combinations thereof; as well as any of the foregoing polymers with coating thereon including metal coating(s).

2. Description of the Related Art

Compressors are known for use in the field of compressing fluids, such as gases, including refrigerants. Most compressors of the prior art utilize electric motors to provide the energy to power the compressing elements. However, the prior art also utilizes power other than electric power to drive the compressing elements and it is to be understood that the invention is applicable to these types of compressors as well.

In FIG. 1 is shown a scroll compressor 8 according to the prior art. The scroll compressor 8, shown in FIG. 1 comprises a housing 10 and cover 12. Inlet and outlet ports are provided for admitting and discharging a compressible fluid, such as a gas. FIG. 2 shows the scroll compressor 8 of FIG. 1, with the housing 10 and cover removed. An electric motor 14 powers the compressor. FIG. 3A is an exploded view of the scroll compressor 8 of FIG. 1 with the housing 10 removed. FIG. 3B is an enlarged view of the compressing component (without motor 14).

As will be appreciated, motor 14 rotates spiral scroll 17 having a spiral configuration. As the spiral rotates within upper scroll 11, it compresses a fluid captured within the flutes of the spiral. Guide 16 orients the upper scroll 11 to a support collar 15. A bearing 20 fits about the shaft of motor 14 and within the spiral scroll 17. In one embodiment, the spiral scroll 17 and the upper scroll 11 have matching draft angles. The draft angles can vary, depending on the user's need. In one embodiment, for instance, the matching draft angles range from more than 0 to 10 degrees. The spiral scroll 17 and the upper scroll 11 can be made by any suitable method. Examples of such methods for making the upper scroll and/or spiral scrolls include: injection molding techniques (including and not limited to lost core manufacturing techniques and collapsible core manufacturing techniques), additive manufacturing (3-dimensional printing). In another embodiment, when the spiral scroll 17 and/or the upper scroll 11 are made by lost core manufacturing techniques, collapsible core manufacturing techniques, the matching draft angles range can be 0. In one embodiment, the spiral scroll 17 and the upper scroll 11 are made by injection molding processes. After a scroll has been made by an injection molding process, it can be subjected to secondary machining operations such as lapping operations.

In the prior art, the spiral scroll 17 is made of metal. Upper scroll 11, guide 16, and support collar 15 are also made of metal. Such components are expensive to make, requiring machining and/or balancing, are noisy and inefficiently consume power during operation, and are prone to corrosion.

Therefore there exists a need to provide compressing members of a scroll compressor that avoids these deficiencies in the existing prior art.

BRIEF SUMMARY OF THE INVENTION

This disclosure relates to improvements in compressor manufacture and structure. Various embodiments utilize polymeric components of specified properties as alternatives to the heretofore manufactured compressors which are constructed primarily of metal. Of particular utility are components manufactured of polymeric material which retains at least 90% of its dimensions after being exposed to a mixture of refrigerant(s) and lubricant(s) for 30 days at 60 degrees Celsius; and/or at least 90% of its tensile strength after being exposed to a mixture of refrigerant(s) and lubricant(s) for 30 days; and/or exhibits a creep of less than or equal to 105 after being exposed to a mixture of refrigerants) and lubricant(s) for 30 days. Various embodiments can employ polymeric materials selected from the group consisting of: polyetherimides, polyphenylene sulfides, polyketones such as polyaryl ether ketones, polyketones such as polyether ether ketone, polysulfones, liquid crystal polymers, and combinations thereof, as meeting these requirements. According to various embodiments, the polymeric material can have a metal coating and/or a crosslinkable organic base coat. The crosslinkable organic base coat can, for example, comprise an acrylate or a urethane-based polymer. The compressors formed with these polymeric components are lighter in weight and require less energy to effect the same compression accomplished by prior art compressors. Alternatively, when used with the same motors as the prior art, they are able to achieve higher output than the all metal prior art compressors. The polymeric components also exhibit improved resistant to corrosion as compared to a compressor formed of metal.

Various embodiments provide a spiral scroll made of a "polymeric" material as defined below. It is also within the scope of the invention to additionally use a polymeric material to form other components of a compressor, including the support collar, the guide, the upper scroll, the housing and/or cap.

In one embodiment, the spiral scroll and the upper scroll have matching draft angles. The draft angles can vary, depending on the user's need. In one embodiment, for instance, the matching draft angles range from more than 0 to 10 degrees. The spiral scroll and the upper scroll can be made by any suitable method. Examples of such methods for making the upper scroll and/or spiral scrolls include: injection molding techniques (including and not limited to lost core manufacturing techniques and collapsible core manufacturing techniques), additive manufacturing (3-dimensional printing). In another embodiment, when the spiral scroll and/or the upper scroll are made by lost core manufacturing techniques, collapsible core manufacturing techniques, the matching draft angles range can be 0. In one embodiment, the spiral scroll and the upper scroll are made by injection molding processes. After a scroll has been made by an injection molding process, it can be subjected to secondary machining operations such as lapping operations. The polymeric material can be one selected from the group consisting of polyetherimides, polyphenylene sulfides, polyketones, polysulfones, liquid crystal polymers, and combinations thereof. These polymeric materials exhibit sufficient properties, including resistance to corrosion from compressible fluids, including gases, such as refrigerants and lubricants associated therewith. Particularly encountered refrigerants include hydrofluorocarbons, including R410A and R134A. Lubricants associated with such refrigerants may include polyalkylene glycols.

The components made of polymeric materials according to the invention are lighter in weight, as compared to the metal components of the prior art, and are easier to fabricate than the metal parts, as they can be manufactured by existing shaping techniques, such as injection molding, transfer molding, compression molding, forging and similar plastics forming techniques.

Reinforcing shapes, such as bosses, hoops or ribs can be designed into the polymeric components. Reinforcing materials or inserts, such as metal or threaded apertures, can be designed into the components of the invention, as molded, and do not have to be machined into the component as required of metal components. Fillers, including particles, fibers, woven or non-woven batts, strands, ribbons, tows and fabrics can be incorporated into the compresssor components of the invention during the fabrication thereof, a technique not possible with metal formed components. These fillers can be tailored to impart further desirable physical properties to the polymeric component(s) of the compressors.

BRIEF DESCRIPTION OF THE DRAWINGS

These and other features, aspects, and advantages of the present invention will become better understood with reference to the following description and appended claims, and accompanying drawings where:

FIG. 3A is a schematic representation of the prior art scroll compressor of FIG. 2 in a partially exploded view;

FIG. 3B is a schematic representation of a portion of the prior art scroll compressor of FIG. 3A enlarged to show detail;

FIG. 5A shows a schematic representation, in an exploded view of the scroll compressor according to the invention in relation to a polymeric housing and cap;

FIG. 5B is a schematic, enlarged view of a portion of fig. 5A to show detail;

FIG. 5C is a schematic, enlarged view, partially cross-sectioned of FIG. 5A to show detail of metal embedded in the reinforcing, ribs of the polymeric housing;

FIG. 6 is a schematic, partially cross-sectioned view of the structural relationship of square locking plugs of the support collar in relation to the polymeric housing; and, FIG. 7 is a flow diagram of the additive manufacturing processing life-cycle.

FIGS. 8-18 are photographs of test specimens before and after exposure to illustrate the effect, or lack of effect, of chemical agents on the specimens tested.

Figure 2:
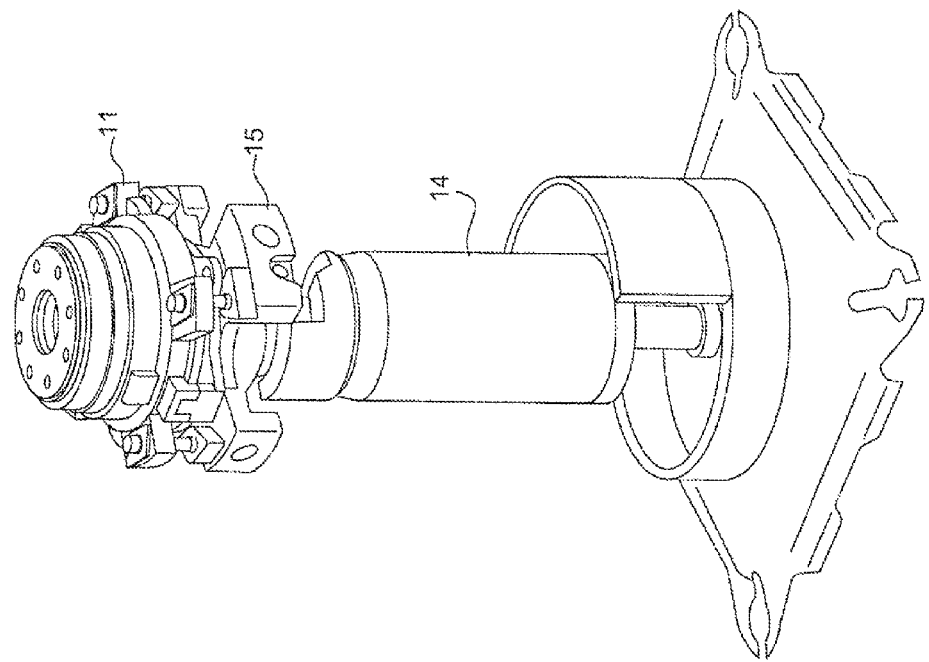
FIG. 2 is a schematic representation of the prior art scroll compressor of FIG. 1 with the housing and cover removed.
Figure 1:
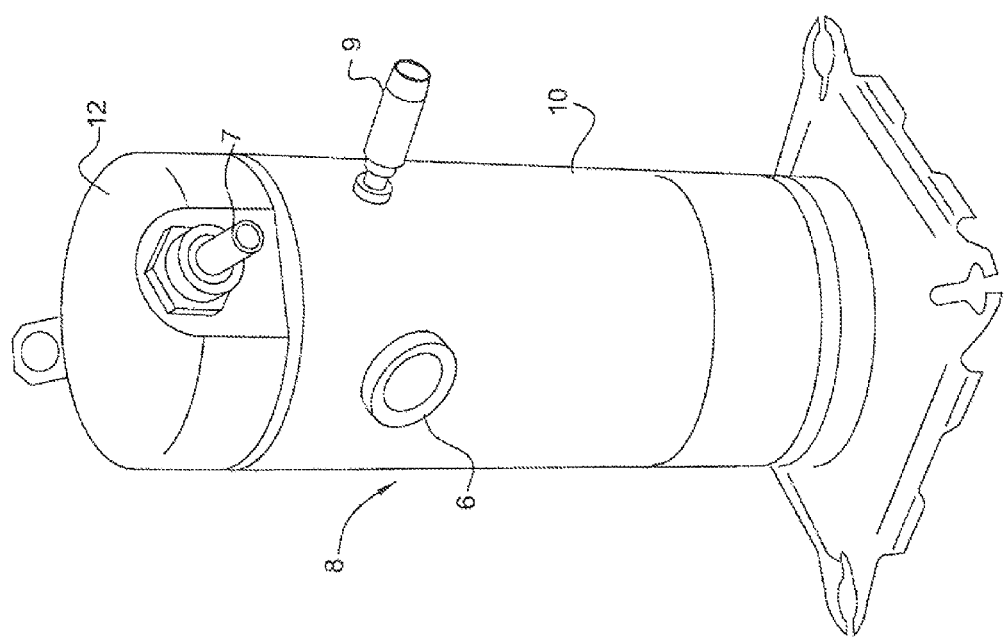
FIG. 1 is a schematic representation of a prior art scroll compressor.

It should be understood that the various embodiments are not limited to the arrangements and instrumentality shown in the drawings.

DETAILED DESCRIPTION OF THE INVENTION

The present invention relates to improvements in compressor manufacture and structure. The invention utilizes polymeric components of specified properties as alternatives to the heretofore manufactured compressors which are constructed primarily of metal. Of particular utility are components manufactured of polymeric material which retains at least 90% of its dimensions after being exposed to a mixture of refrigerant(s) and lubricant(s) for 30 days at temperatures between 60° C. and 127° C.; and/or at least 85% of its tensile strength after being exposed to a mixture of refrigerant(s) and lubricant(s) for 30 days; and/or exhibits a creep of less than or equal to 105 after being exposed to a mixture of refrigerants) and lubricant(s) for 30 days. We have identified polymeric materials being one selected from the group consisting of (i) polyetherimides, (ii) polyphenylene sulfides, (iii) polyketones such as polyaryl ether ketones, (iv) polyketones such as polyether ether ketone, (v) polysulfones, (vi) liquid crystal polymers, and (vii) combinations thereof, as meeting these requirements. The use of a metal coating improves barrier performance (by decreasing diffusion, with diffusion rates=$10^{-7}$ scc*cm/s/cm$^2$/Pa (uncoated) to $10^{-12}$ scc*cm/s/cm$^2$/Pa (coated). The use of metal coatings are the preferred embodiment for housings. The compressors formed with these polymeric components are lighter in weight and require less energy to effect the same compression accomplished by prior art compressors. Alternatively, when used with the same motors as the prior art, they are able to achieve higher output than the all metal prior art compressors. The polymeric components also exhibit improved resistant to corrosion as compared to a compressor formed of metal.

The present invention may be understood more readily by reference to the following detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

FIGS. 1, 2, 3A and 3B are views of compressors according to the prior art.

Figure 4:
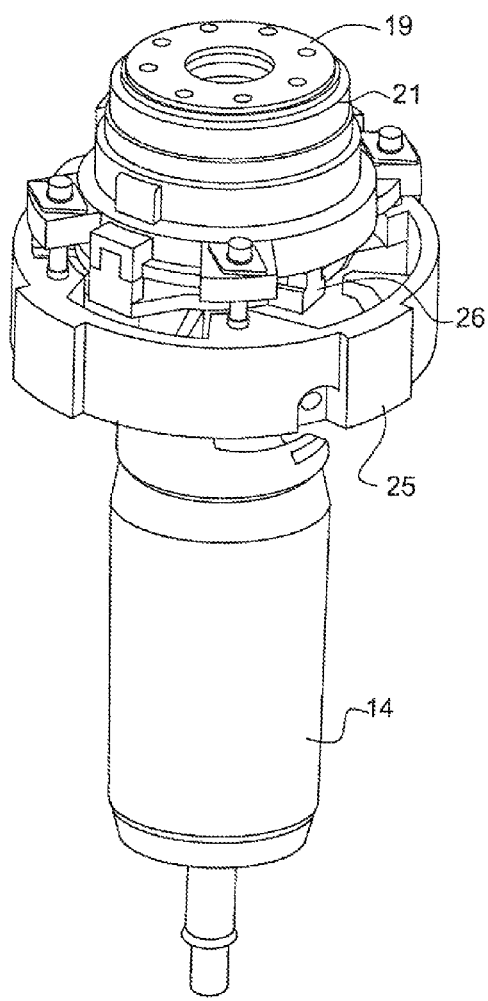
FIG. 4 is a schematic representation according to the invention of an improved scroll compressor.
Figure 4A:
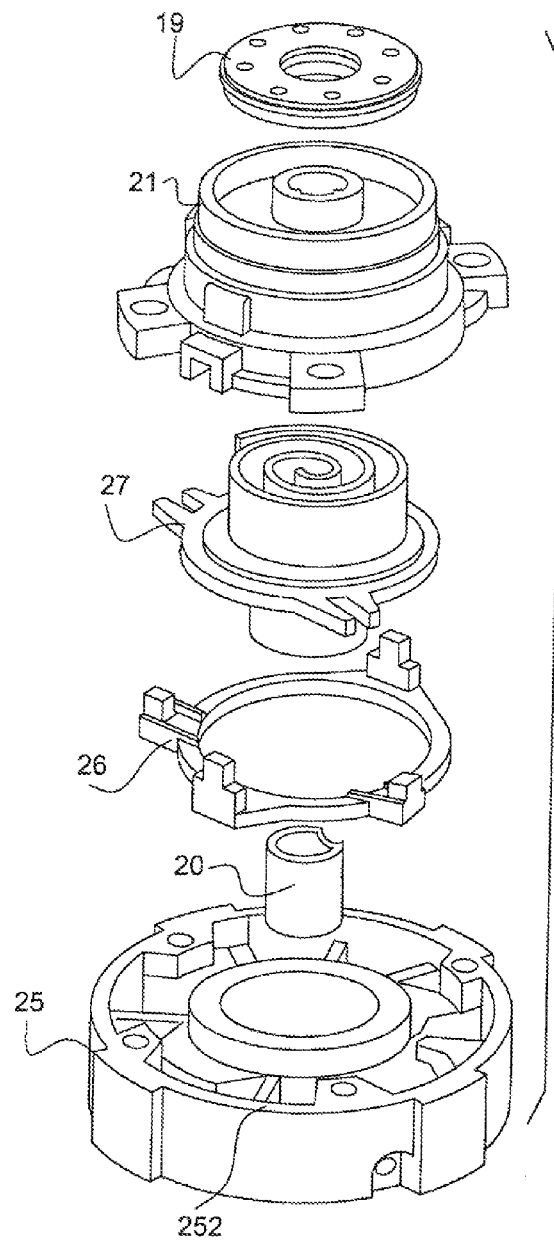
FIG. 4A is an exploded view of a portion of the scroll compressor of the invention to show details of the invention.

FIGS. 4 and 4A are embodiments of a scroll compressor according to the invention.

Spiral scroll 27 is made of a polymeric material, preferably a polyetherimide, which could be a homopolymer, polyphenylene sulfides, polyaryl ether ketones, polyether ether ketone, polysulfones, and liquid crystal polymers.

The polymeric material may comprise one selected from the group consisting of polyetherimides, polyphenylene sulfides, polyaryl ether ketones, polyether ether ketone, polysulfones, liquid crystal polymers, and combinations thereof.

As shown in FIGS. 4 and 4A, the support collar 25 is formed of the polymeric material configured with a reinforcing ring 252, as compared to the shape of the collar 15 of FIG. 3B. Reinforcing ring 252 may include square locking plugs 251 to fit into and thereby locate the support collar 25 relative to the housing 30 (FIG. 5A), also made of polymeric material.

Similarly guide 26 can be fabricated from polymeric material by the molding techniques mentioned above, thereby avoiding the machining necessary to make the intricate shaped guide 16 of the prior art from metal.

Upper scroll 21, as shown in FIG. 4A, can also be formed of polymeric material as shown. To avoid any doubt it is within the scope of this invention that components 21, 25, 26, 27, 30, 32 and 33, can each, independent of the other components be formed of polymeric material. It is additionally within the scope of the invention, that one or more prior art components can be used in combination with one or more polymeric components, without departing from the invention. Thus, in FIG. 4A, bearing, 20 is illustrated as being made of metal in the same manner as bearing 20, or the prior art compressor shown in FIG. 3B.

FIG. 5B is an enlarged view of a portion of a polymer housing 30 showing the details of the mating of square locking plugs 251 in the upper end of housing 30 of FIG. 5A. An electrical connection 36 can provide a source of electricity to motor 14, via connecting socket 37.

FIG. 6 illustrates the assembled polymeric housing 30, the polymeric cover 32, in a partially cross-sectioned view of FIG. 5A, Reinforcing ribs 31 can be incorporated into the design of the polymeric components as was done to strengthen housing 30 in FIG. 5A.

As shown in the enlarged, partially cross-sectioned view of FIG. 5C, metal reinforcement 40, 41, 42, may be embedded in the reinforcing ribs 31 of the polymeric housing 30.

The polymeric materials utilized in the invention can be described as follows:

The polyetherimide can be selected from polyetherimide homopolymers, e.g., polyetherimides, polyetherimide co-polymers, e.g., polyetherimide sulfones, and combinations thereof. Polyetherimides are known polymers and are sold by SABIC Innovative Plastics under the Ultem*, Extem*, and Siltem* brands (Trademark of SABIC Innovative Plastics IP B.V.).

In one embodiment, the polyetherimides are of formula (1):

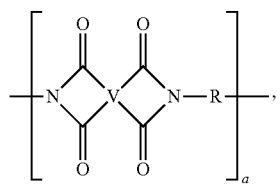

(1)

wherein a is more than 1, for example 10 to 1,000 or more, or more specifically 10 to 500.

The group V in formula (1) is a tetravalent linker containing an ether group (a "polyetherimide" as used herein) or a combination of an ether groups and arylene sulfone groups (a "polyetherimide sulfone"). Such linkers include but are not limited to: (a) substituted or unsubstituted, saturated, unsaturated or aromatic monocyclic and polycyclic groups having 5 to 50 carbon atoms, optionally substituted with ether groups, arylene sulfone groups, or a combination of ether groups and arylene sulfone groups; and (b) substituted or unsubstituted, linear or branched, saturated or unsaturated alkyl groups having 1 to 30 carbon atoms and optionally substituted with ether groups or a combination of ether groups, arylene sulfone groups, and arylene sulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

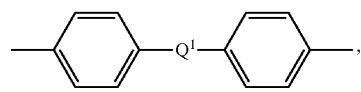

(2)

wherein $Q^1$ includes but is not limited to a divalent moiety such as —O—, —S—, —C(O)—, —SO$_2$—, —SO—, —C$_y$H$_{2y}$— (y being an integer from 1 to 5), and halogenated derivatives thereof, including perfluoroalkylene groups.

In an embodiment, linkers V include but are not limited to tetravalent aromatic groups of formula (3):

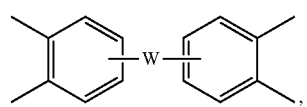

(3)

wherein W is a divalent moiety including —O—, —SO$_2$—, or a group of the formula —O—Z—O— wherein the divalent bonds of the —O— or the —O—Z—O— group are in the 3,3', 3,4', 4,3', or the 4,4' positions, and wherein Z includes, but is not limited, to divalent groups of formulas (4):

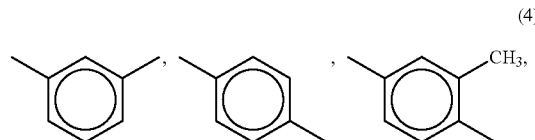

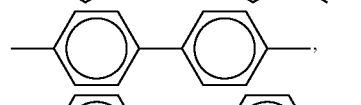

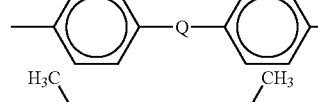

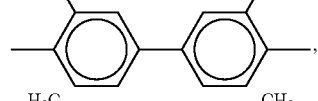

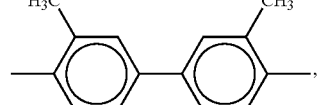

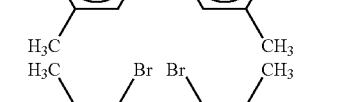

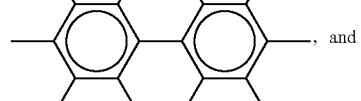

(4)

wherein Q includes, but is not limited to a divalent moiety including —O—, —S—, —C(O), —SO$_2$—, —SO—, —$C_yH_{2y}$— (y being an integer from 1 to 5), and halogenated derivatives thereof, including perfluoroalkylene groups.

In a specific embodiment, the polyetherimide comprise more than 1, specifically 10 to 1,000, or more specifically, 10 to 500 structural units, of formula (5):

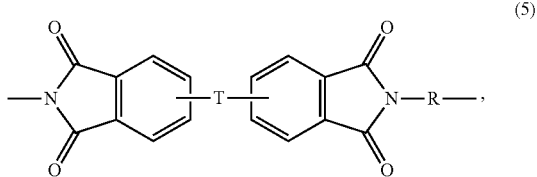
(5)

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (3) as defined above; and R is a divalent group of formula (2) as defined above.

In another specific embodiment, the polyetherimide sulfones are polyetherimides comprising ether groups and sulfone groups wherein at least 50 mole % of the linkers V and the groups R in formula (1) comprise a divalent arylene sulfone group. For example, all linkers V, but no groups R, can contain an arylene sulfone group; or all groups R but no linkers V can contain an arylene sulfone group; or an arylene sulfone can be present in some fraction of the linkers V and R groups, provided that the total mole fraction of V and R groups containing an aryl sulfone group is greater than or equal to 50 mole %.

Even more specifically, polyetherimide sulfones can comprise more than 1, specifically 10 to 1,000, or more specifically, 10 to 500 structural units of formula (6):

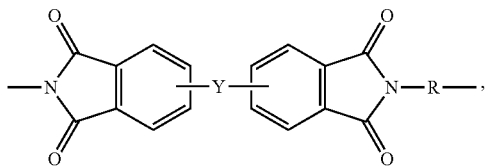
(6)

wherein Y is —O—, —$SO_2$—, or a group of the formula —O—Z—O— wherein the divalent bonds of the —O—, $SO_2$—, or the —O—Z—O— group are in the 3,3', 3,4', 4,3', or the 4,4' positions, wherein Z is a divalent group of formula (3) as defined above and R is a divalent group of formula (2) as defined above, provided that greater than 50 mole % of the sum of moles Y+moles R in formula (2) contain —$SO_2$— groups.

It is to be understood that the polyetherimides and polyetherimide sulfones can optionally comprise linkers V that do not contain ether or ether and sulfone groups, for example linkers of formula (7):

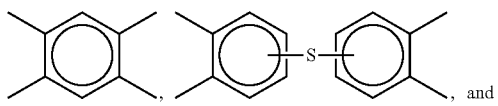
(7)

, and

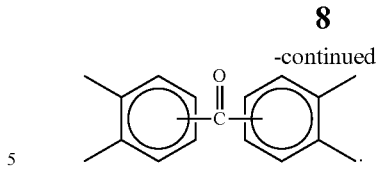

Imide units containing such linkers are generally be present in amounts ranging from 0 to 10 mole % of the total number of units, specifically 0 to 5 mole %. In one embodiment no additional linkers V are present in the polyetherimides and polyetherimide sulfones.

In another specific embodiment, the polyetherimide comprises 10 to 500 structural units of formula (5) and the polyetherimide sulfone contains 10 to 500 structural units of formula (6).

In one embodiment, the polyetherimides include a polyetherimide thermoplastic resin composition, comprising: (a) a polyetherimide resin, and (b) a phosphorus-containing stabilizer, in an amount that is effective to increase the melt stability of the poly-etherimide resin, wherein the phosphorus-containing stabilizer exhibits a low volatility such that, as measured by thermogravimetric analysis of an initial amount of a sample of the phosphorus-containing stabilizer, greater than or equal to 10 percent by weight of the initial amount of the sample remains unevaporated upon heating of the sample from room temperature to 300° C. at a heating rate of a 20° C. per minute under an inert atmosphere. In one embodiment, the phosphorous-containing stabilizer has a formula P—$R'_a$, where R' is independently H, alkyl, alkoxy, aryl, aryloxy, or oxy substituent and a is 3 or 4. Examples of such suitable stabilized polyetherimides can be found in U.S. Pat. No. 6,001,957, incorporated herein in its entirety.

The polyetherimide and polyetherimide sulfones can be prepared by various methods, including, but not limited to, the reaction of a bis(phthalimide) for formula (8):

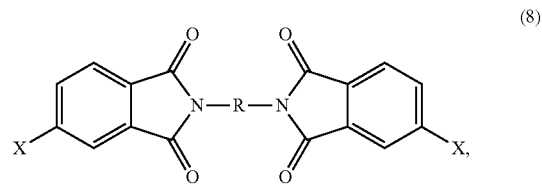
(8)

wherein R is as described above and X is a nitro group or a halogen. Bis-phthalimides (8) can be formed, for example, by the condensation of the corresponding anhydride of formula (9):

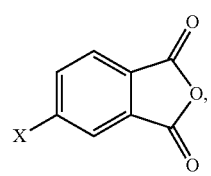
(9)

wherein X is a nitro group or halogen, with an organic diamine of the formula (10):

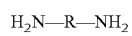
$H_2N$—R—$NH_2$ (10), wherein R is as described above.

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl) propane, 2,4-bis(b-amino-t-butyl) toluene, bis(p-b-amino-t-butylphenyl)ether, bis(p-b-methyl-o-aminophenyl)benzene, bis(p-b-methyl-o-aminopentyl)benzene, 1,3-diamino-4-isopropylbenzene, bis(4-aminophenyl)ether and 1,3-bis(3-aminopropyl)tetramethyldisiloxane. Mixtures of these amines can be used. Illustrative examples of amine compounds of formula (10) containing sulfone groups include but are not limited to, diamino diphenyl sulfone (DDS) and bis(aminophenoxy phenyl) sulfones (BAPS). Combinations comprising any of the foregoing amines can be used.

The polyetherimides can be synthesized by the reaction of the bis(phthalimide) (8) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No. 5,229,482. Specifically, the dihydroxy substituted aromatic hydrocarbon a bisphenol such as bisphenol A, or a combination of an alkali metal salt of a bisphenol and an alkali metal salt of another dihydroxy substituted aromatic hydrocarbon can be used.

In one embodiment, the polyetherimide comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a bisphenol A group). Further, the polyetherimide sulfone comprises structural units of formula (6) wherein at least 50 mole % of the R groups are of formula (4) wherein Q is —SO$_2$— and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

The polyetherimide and polyetherimide sulfone can be used alone or in combination with each other and/or other of the disclosed polymeric materials in fabricating the polymeric components of the invention. In one embodiment, only the polyetherimide is used. In another embodiment, the weight ratio of polyetherimide:polyetherimide sulfone can be from 99:1 to 50:50.

The polyetherimides can have a weight average molecular weight (Mw) of 5,000 to 100,000 grams per mole (g/mole) as measured by gel permeation chromatography (GPC). In some embodiments the Mw can be 10,000 to 80,000. The molecular weights as used herein refer to the absolute weight averaged molecular weight (Mw).

The polyetherimides can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyetherimides can have a glass transition temperature of greater than 180° C., specifically of 200° C. to 500° C., as measured using differential scanning calorimetry (DSC) per ASTM test D3418. In some embodiments, the polyetherimide and, in particular, a polyetherimide has a glass transition temperature of 240 to 350° C.

The polyetherimides can have a melt index of 0.1 to 10 grams per minute (g/min), as measured by American Society for Testing Materials (ASTM) DI 238 at 340 to 370° C., using a 6.7 kilogram (kg) weight.

One process for the preparation of polyetherimides having structure (1) is referred to as the nitro-displacement process (X is nitro in formula (8)). In one example of the nitro-displacement process, N-methyl phthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of bisphenol-A (BPA) in the presence of a phase transfer catalyst. This reaction yields BPA-bisimide and NaNO$_2$ in what is known as the nitro-displacement step. After purification, the BPA-bisimide is reacted with phthalic anhydride in an imide exchange reaction to afford BPA-dianhydride (BPADA), which in turn is reacted with meta-phenylene diamine (MPD) in ortho-dichlorobenzene in an imidization-polymerization step to afford the product polyetherimide.

An alternative chemical route to polyetherimides having structure (1) is a process referred to as the chloro-displacement process (X is Cl in formula (8)). The chloro-displacement process is illustrated as follows: 4-chloro phthalic anhydride and meta-phenylene diamine are reacted in the presence of a catalytic amount of sodium phenyl phosphinate catalyst to produce the bischloro phthalimide of meta-phenylene diamine (CAS No. 148935-94-8). The bischloro phthalimide is then subjected to polymerization by chloro-displacement reaction with the disodium salt of BPA in the presence of a catalyst in ortho-dichlorobenzene or anisole solvent. Alternatively, mixtures of 3-chloro- and 4-chlorophthalic anhydride may be employed to provide a mixture of isomeric bischloro phthalimides which may be polymerized by chloro-displacement with BPA disodium salt as described above.

Siloxane polyetherimides can include polysiloxane/polyethenrimide block copolymers having a siloxane content of greater than 0 and less than 40 weight percent (wt %) based on the total weight of the block copolymer. The block copolymer comprises a siloxane block of Formula (1):

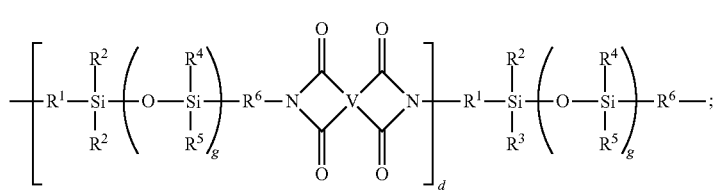

(I)

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20. Commercially available siloxane polyetherimides can be obtained from SABIC Innovative Plastics under the brand name SILTEM* (*Trademark of SABIC Innovative Plastics IP B.V.)

The polyetherimide resin can have a weight average molecular weight (Mw) within a range having a lower limit and/or an upper limit. The range can include or exclude the lower limit and/or the upper limit. The lower limit and/or upper limit can be selected from 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000, 51000, 52000, 53000, 54000, 55000, 56000, 57000, 58000, 59000, 60000, 61000, 62000, 63000, 64000, 65000, 66000, 67000, 68000, 69000, 70000, 71000, 72000, 73000, 74000, 75000, 76000, 77000, 78000, 79000, 80000, 81000, 82000, 83000, 84000, 85000, 86000, 87000, 88000, 89000, 90000, 91000, 92000, 93000, 94000, 95000, 96000, 97000, 98000, 99000, 100000, 101000, 102000, 103000, 104000, 105000, 106000, 107000, 108000, 109000, and 110000 daltons. For example, the polyetherimide resin can have a weight average molecular weight (Mw) from 5,000 to 100,000 daltons, from 5,000 to 80,000 daltons, or from 5,000 to 70,000 daltons. The primary alkyl amine modified polyetherimide will have lower molecular weight and higher melt flow than the starting, unmodified, polyetherimide.

The polyetherimide resin can be selected from the group consisting of a polyetherimide, for example as described in U.S. Pat. Nos. 3,875,116; 6,919,422 and 6,355,723; a silicone polyetherimide, for example as described in U.S. Pat. Nos. 4,690,997; 4,808,686; a polyetherimide sulfone resin, as described in U.S. Pat. No. 7,041,773 and combinations thereof, each of these patents are incorporated herein their entirety.

The polyetherimide resin can have a glass transition temperature within a range having a lower limit and/or an upper limit. The range can include or exclude the lower limit and/or the upper limit. The lower limit and/or upper limit can be selected from 100, 110, 120, 130, 140, 150, 160, 170, 180, 190, 200, 210, 220, 230, 240, 250, 260, 270, 280, 290, and 300 degrees Celsius. For example, the polyetherimide resin can have a glass transition temperature (Tg) greater than about 200 degrees Celsius.

The polyetherimide resin can be substantially free (less than 100 ppm) of benzylic protons. The polyetherimide resin can be free of benzylic protons. The polyetherimide resin can have an amount of benzylic protons below 100 ppm. In one embodiment, the amount of benzylic protons ranges from more than 0 to below 100 ppm. In another embodiment, the amount of benzylic protons is not detectable.

The polyetherimide resin can be substantially free (less than 100 ppm) of halogen atoms. The polyetherimide resin can be free of halogen atoms. The polyetherimide resin can have an amount of halogen atoms below 100 ppm. In one embodiment, the amount of halogen atoms range from more than 0 to below 100 ppm. In another embodiment, the amount of halogen atoms is not detectable.

Among the polyamides having a Tm that is more than 280 degrees Celsius can be stated to be those commercially available polyamides known as nylon 6 and nylon 66.

Poly(arylene sulfide)s are known polymers containing arylene groups separated by sulfur atoms. They include poly (phenylene sulfide)s, for example poly(phenylene sulfide) and substituted poly(phenylene sulfide)s. Typical poly (arylene sulfide) polymers comprise at least 70 molar %, preferably at least 90 molar %, of recurring units of the following structural formula:

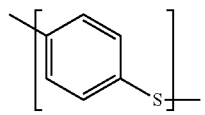

The poly(arylene sulfide) is a linear polymer. Linear poly (arylene sulfide) may be prepared by, for example, a process disclosed in U.S. Pat. Nos. 3,354,129 or 3,919,177 both of which are incorporated herein by reference. Linear poly (arylene sulfide) is commercially available from Ticona as Fortron® PPS and from Chevron Phillips as Ryton® PPS The poly(arylene sulfide) may be functionalized or unfunctionalized. If the poly(arylene sulfide) is functionalized, the functional groups may include, but are not limited to, amino, carboxylic acid, metal carboxylate, disulfide, thio and metal thiolate groups. One method for incorporation of functional groups into poly(arylene sulfide) can be found in U.S. Pat. No. 4,769,424, incorporated herein by reference, which discloses incorporation of substituted thiophenols into halogen substituted poly(arylene sulfide). Another method involves incorporation of chlorosubstituted aromatic compounds containing the desired functionality reacted with an alkali metal sulfide and chloroaromatic compounds. A third method involves reaction of poly(arylene sulfide) with a disulfide containing the desired functional groups, typically in the melt or in a suitable high boiling solvent such as chloronaphthalene. Though the melt viscosity of poly(arylene sulfide) is not particularly limited so far as the moldings which can be obtained, the melt viscosity can be greater than or equal to 100 Poise and less than of equal to 10,000 Poise at the melt processing temperature. The poly(arylene sulfide) may also be treated to remove contaminating ions by immersing the resin in deionized water or by treatment with an acid, typically hydrochloric acid, sulfuric acid, phosphoric acid or acetic acid as found in 10 Japanese Kokai Nos. 3236930-A, 1774562-A, 12299872-A and 3236931-A. For some product applications, it is preferred to have a very low impurity level in the poly(arylene sulfide), represented as the percent by weight ash remaining after burning a sample of the poly (arylene sulfide). The ash content of the poly(arylene sulfide) can be less than about 1% by weight, more specifically less than about 0.5% by weight, or even more specifically less than about 0.1% by weight.

The poly(arylene sulfide) is present in an amount of 24 to 85 weight percent, based on the total weight of the composition. Within this range the amount of poly(arylene sulfide) can be greater than or equal to 30 weight percent, or more specifically, greater than or equal to 40 weight percent. Also within this range the amount of poly(arylene ether) can be less than or equal to 80, or, more specifically, less than or equal to 75 weight percent.

Suitable liquid crystal polymers may be any liquid crystal polymer, which when used in conjunction with the invention, makes it possible to produce a compressing member or compressor within the scope of the invention. Liquid crystal polymers include aromatic polyesters. The polyketones can be any polyketone, such as polyaryl ether ketones, (vi) polyether ether ketones, which when used in conjunction with the invention, makes it possible to make a compressing member and compressor within the scope of our invention. The aromatic polyketone can comprises repeating units of Formula (II)

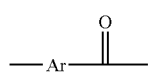

(II)

wherein Ar is independently at each occurrence a substituted or unsubstituted, monocyclic or polycyclic aromatic group having 6 to 30 carbons. Exemplary Ar groups include phenyl, tolyl, napthyl, and biphenyl. Additional aromatic groups are disclosed in WO 02/02158. The aromatic polyketone can be a polyaryletherketone in which case it comprises repeating units of Formula (II) and repeating units of Formula (III)

—Ar—O—  (III)

wherein Ar is defined as above. In some embodiments the aromatic polyketone comprises a polyetherketone. Polyetherketone comprises repeating units of Formula (IV)

(IV)

wherein Ar is defined as above and Ar¹. Ar¹ is independently at each occurrence a substituted or unsubstituted, monocyclic or polycyclic aromatic group having 6 to 30 carbons. Ar may be the same as or different from Ar¹. In some embodiments Ar and Ar¹ are phenyl groups. In some embodiments the aromatic polyketone comprises a polyetheretherketone. Polyetheretherketone comprise repeating units of Formula (V)

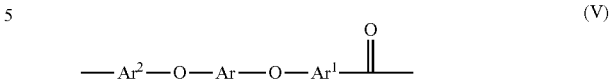

(V)

wherein Ar and Ar¹ are defined as above. Ar² is independently at each occurrence a substituted or unsubstituted, monocyclic or polycyclic aromatic group having 6 to 30 carbons. Ar, Ar¹, and Ar² may be the same as or different from each other. Additionally, two of Ar, Ar¹, and Ar² may be the same as each other and the third may be different. In some embodiments Ar, Ar¹, and Ar² are phenyl groups.

Aromatic polyketones are well known and commercially available. Examples of commercially available aromatic polyketones include PEEK™ polymers by VICTREX.

In one embodiment, the polymeric material may further comprise fillers. Preferred fillers include glass fillers. e.g., glass fiber fillers, and carbon fiber fillers. Glass fillers and carbon fiber fillers are known. Examples of suitable glass and carbon fibers include and not limited to reinforcing fibers having a non-circular cross-section. In one embodiment, flat glass fibers can be used. Other types of suitable fillers can include S-Glass, E-Glass, Continuous Glass, industrial carbon fibers, aerospace carbon fibers, continuous carbon fibers, and combinations thereof. The amount of the filler can vary, depending on the application and can range from more than 0 to less than or equal to 60 weight %. When such fillers are present, the polymeric material is in the form of a composite material in some embodiments.

A compressing member can be made by various processes. Examples of suitable conversion processing for developing and manufacturing compressor components are likely but not limited to (i) high pressure injection molding, (ii) profile extrusion, (iii) compression molding processes that may or may not utilize high temperature controls based on oil, superheated water, steam or induction, (iv) variants of thermoforming including but not limited to matched metal forming, (v) rotational molding over an inserted structure. In another embodiment, components of our invention can be additive manufacturing.

According to various embodiments the polymeric member can have a metal coating and possibly a crosslinkable organic base coat. The crosslinkable organic base coat can comprise an acrylate-based polymer, or a urethane-based polymer. The metal coating can be added to the surface of the polymeric member to improve barrier performance by decreasing diffusion. According to various embodiments of the invention, a component can comprise a polymeric member coated with a metal coating. In an uncoated state if the component can have a diffusion rate of about $10^{-7}$ scc*cm/s/cm²/Pa. When coated with a metallic coating, the component can have a diffusion rate of about $10^{-12}$ scc*cm/s/cm²/Pa.

According to various environments, no leaching of polymers is observed, the detectable limit for leaching being less than or equal to 10 ppm for polyetherimides, and polysulfones.

The invention is further described in the following illustrative examples in which all parts and percentages are by weight unless otherwise indicated.

EXAMPLES

Examples 1-6

The objective of these examples was to evaluate the changes in dimensions that polymer molded samples underwent when exposed to temperature (60 degrees Celsius) in Nitrogen (N₂), lubricants (10CST, 32CST), Refrigerants (R134A, R410A) individually and combination thereof at 60 degrees Celsius for a period of 30 Days.

Summary of Examples 1-6

| Example | Material Used | Material Description |
|---|---|---|
| 1 | 1010 | Polyetherimide, supplied by SABIC under ULTEM 1010 resin grade |
| 2 | CRS5001 | Polyetherimide, supplied by SABIC under ULTEM CRS5001 resin grade |
| 3 | DH1004 | Polyetherimide Blends, supplied by SABIC under ULTEM DH1004 resin grade |
| 4 | ULTEM/PPS | Supplied by SABIC polyetherimide/polyphenolsulfone blend. It's a blend ULTEM1010 resin and Polyphynelene Sulphide (PPS supplied by Ticona)-ULTEM 1010 in the range of 50-70 wt % and PPS in the range of 50 to 30 wt % |
| 5 | Stanyl | High Temperature Nylon resin grade supplied by DSM |
| 6 | Amodel | High Temperature Polypthalamide (PPA) resin grade supplied by Amodel |

Experimental Details/Results

Injection molded samples (Type V, ASTM standard bars) of the materials identified in the summary of Examples 1-6, in the form of tensile bars, were molded under standard molding conditions. These samples were enclosed in a steel tube and exposed to the above mentioned conditions and environments. The dimension changes were recorded at the end of 30 days by measuring the cross section area changes of the specimen, with respect to the as molded values. The dimension change (in percentages relative to the original dimensions) at the end of 30 days of exposure are shown in Table 1.

TABLE 1

| Operating Condition | Ex. 1 | Ex. 2 | Ex. 3 | Ex. 4 | Ex. 5 | Ex. 6 |
|---|---|---|---|---|---|---|
| N₂ Operating Environment (60° C.) | 0.00% | −6.25% | −6.25% | −6.25% | −6.25% | 0.00% |
| 10 CST Lubricant at 60° C. | −6.25% | −6.25% | −6.25% | −6.25% | −6.25% | 0.00% |
| 32 cst Lubricant at 60° C. | −6.25% | −6.25% | −6.25% | −6.25% | −6.25% | 0.00% |
| R410A Refrigerant at 60° C. | −6.25% | −6.25% | −6.25% | −6.25% | −6.25% | 0.00% |
| R134A Refrigerant at 60° C. | −6.25% | −6.25% | −6.25% | −6.25% | 0.00% | −6.25% |
| R410A + 10 cst + 300 psi Combinations (at 60° C.) | −6.25% | −6.50% | −6.25% | −6.25% | −6.25% | 0.00% |

Discussion

Examples 1 through 6 show that all the polymers used shows changes less than 10 percent change in cross sectional area at 60 degrees Celsius.

Examples 7-12

The objective of these examples was to evaluate the changes in dimensions that polymer molded samples underwent when exposed to temperature (127 degrees Celsius) in nitrogen (N₂), lubricants (10CST, 32CST), refrigerants (R134A, T410A) individually and combination of thereof at 127 degrees Celsius for a period of 30 Days.

Summary of Examples 7-12

| Example | Material Used | Material Description |
|---|---|---|
| 7 | 1010 | Polyetherimide, supplied by SABIC under ULTEM 1010 grade name |
| 8 | CRS5001 | Polyetherimide, supplied by SABIC under ULTEM CRS5001 grade name |
| 9 | DH1004 | Polyetherimide Blends, supplied by SABIC under ULTEM DH1004 grade name |
| 10 | ULTEM/PPS | Supplied by SABIC polyetherimide/polyphenolsulfone blend. It's a blend ULTEM1010 resin and Polyphynelene Sulphide (PPS supplied by Ticona)-ULTEM 1010 in the range of 50-70 wt % and PPS in the range of 50 to 30 wt % |
| 11 | Stanyl | HighTemperature Nylon supplied by DSM |
| 12 | Amodel | High Temperature Polypthalamide (PPA) supplied by Amodel |

Experimental Details/Results

Injection molded samples (Type V, ASTM standard bars) in the form of tensile bars of the materials identified in the summary of Examples 7-12 were molded under standard molding conditions. These samples were enclosed in a steel tube and exposed to the above mentioned conditions and environments. The dimension changes were recorded at the end of 30 day by measuring the cross section area changes of the specimen, with respected as molded values. The dimension change (in percentages relative to the original dimensions) at the end of 30 days of exposure are shown in Table 2.

TABLE 2

| Operating Conditions | Ex. 7 | Ex. 8 | Ex. 9 | Ex. 10 | Ex. 11 | Ex. 12 |
|---|---|---|---|---|---|---|
| N₂ Operating Environment (127° C.) | 0.00% | −6.25% | 0.00% | −6.25% | 0.00% | −6.25% |
| 10 CST Lubricant at 127° C. | −6.25% | −6.25% | 0.00% | −6.25% | −6.25% | 0.00% |
| 32 cst Lubricant at 127° C. | 0.00% | −6.25% | 0.00% | −6.25% | 0.00% | 0.00% |
| R410A + 32 cst + 300 psi Combinations at 127° C. | −6.25% | −5.88% | −6.25% | −6.25% | −6.25% | −6.25% |
| R410A + 10 cst + 300 psi Combinations at 127° C. | −6.25% | −6.25% | −6.25% | −6.25% | −6.25% | 0.00% |

Discussion

Examples 7 through 12 show that all the polymers used shows changes less than 10 percent change in cross sectional area at 127 degrees Celsius.

Examples 13-18

The objective of these examples was to evaluate tensile strength and tensile strength changes relative to unexposed polymer molded samples before and after exposed to temperature (60 degrees Celsius), lubricant (10CST, 32CST), refrigerant (R134A, T410A) and combinations of thereof at 60 degrees Celsius for a period of 30 Days.

Summary of Examples 13-18

| Example | Material Used | Material Description |
|---|---|---|
| 13 | 1010 | Polyetherimide, supplied by SABIC under ULTEM 1010 resin grade |
| 14 | CRS5001 | Polyetherimide, supplied by SABIC under ULTEM CRS5001 resin grade |
| 15 | DH1004 | Polyetherimide Blends, supplied by SABIC under ULTEM DH1004 resin grade |
| 16 | ULTEM/PPS | Supplied by SABIC polyetherimide/polyphenolsulfone blend. It's a blend ULTEM1010 resin and Polyphynelene Sulphide (PPS supplied by Ticona)-ULTEM 1010 in the range of 50-70 wt % and PPS in the range of 50 to 30 wt % |
| 17 | Stanyl | High Temperature Nylon resin grade supplied by DSM |
| 18 | Amodel | High Temperature Polypthalamide (PPA) resin grade supplied by Amodel |

Experimental Details

Injection molded samples (Type V, ASTM standard bars) in the form of tensile bars were molded under standard molding conditions. These samples were tested on an Instron tensile testing machine at 0.2 inch/min displacement rate as per ASTM Standard testing protocol. The Results are shown in Table 3, which shows tensile strength in Mpa after exposure to different environments at 60 degrees Celsius.

TABLE 3

| Operating Conditions | Ex. 13 | Ex. 14 | Ex. 15 | Ex. 16 | Ex. 17 | Ex. 18 |
|---|---|---|---|---|---|---|
| As Molded | 106.33 | 95.18 | 97.14 | 76.86 | 72.29 | 73.11 |
| N₂ operating environment at 60° C. | 126.52 | 104.56 | 107.57 | 88.54 | 63.34 | 79.09 |
| 10 CST Lubricant at 60° C. | 124.79 | 101.61 | 106.51 | 82.92 | 94.50 | 77.88 |
| 32 cst Lubricant at 60° C. | 122.57 | 121.38 | 108.45 | 103.85 | 104.68 | 93.50 |
| R410A Refrigerant at 60° C. | 120.77 | 96.80 | 105.33 | 54.40 | 51.78 | 82.66 |
| R134A Refrigerant at 60° C. | 120.49 | 113.01 | 107.00 | 58.38 | 47.42 | 80.14 |
| R410A + 10 cst + 300 psi combinations (at 60° C.) | 109.77 | 90.95 | 94.09 | 65.23 | 67.37 | 67.94 |

Examples 19-24

The objective of these examples was to evaluate tensile strength and tensile strength changes relative to unexposed polymer molded samples before and after exposed to temperature (60 degrees Celsius), lubricant (10cst, 32cst), refrigerant (R134A, T410A) and combinations of thereof at 60 degrees Celsius for a period of 30 Days.

Summary of Example 19-24

| Example | Material Used | Material Description |
|---|---|---|
| 19 | 1010 | Polyetherimide, supplied by SABIC under ULTEM 1010 resin grade |
| 20 | CRS5001 | Polyetherimide, supplied by SABIC under ULTEM CRS5001 resin grade |
| 21 | DH104 | Polyetherimide Blends, supplied by SABIC under ULTEM DH1004 resin grade |
| 22 | ULTEM/PPS | Supplied by SABIC polyetherimide/polyphenylene sulfide blend. It's a blend ULTEM1010 resin and Polyphynelene Sulphide (PPS supplied by Ticona)-ULTEM 1010 in the range of 50-70 wt % and PPS in the range of 50 to 30 wt % |
| 23 | Stanyl | High Temperature Nylon resin grade supplied by DSM |
| 24 | Amodel | High Temperature Polypthalamide (PPA) resin grade supplied by Amodel |

Experimental Details

Injection molded samples (Type V, ASTM standard bars) in the form of tensile bars were molded under standard molding conditions. These samples were tested on an Instron tensile testing machine at 0.2 inch/min displacement rate as per ASTM Standard testing protocol. The Results are shown in Table 4, which shows tensile strength percentage changes after exposure to different environments at 60 degrees Celsius.

TABLE 4

| Operating Conditions | Ex. 19 | Ex. 20 | Ex. 21 | Ex. 22 | Ex. 23 | Ex. 24 |
|---|---|---|---|---|---|---|
| As Molded | 0.0 | 0.0 | 0.0 | 0.0 | 0.0 | 0.0 |
| N₂ operating environment at 60° C. | 19.0 | 9.9 | 10.7 | 15.2 | −12.4 | 8.2 |
| 10 CST (Lubricant) (60° C. | 17.4 | 6.8 | 9.7 | 7.9 | 30.7 | 6.5 |
| 32 cst Lubricant at 60° C. | 15.3 | 27.5 | 11.6 | 35.1 | 44.8 | 27.9 |
| R410A Refrigerant at 60° C. | 13.6 | 1.7 | 8.4 | −29.2 | −28.4 | 13.1 |
| R134A Refrigerant at 60° C. | 13.3 | 18.7 | 10.2 | −24.0 | −34.4 | 9.6 |
| R410A + 10 cst + 300 psi combinations (at 60° C.) | 3.2 | −4.4 | −3.1 | −15.1 | −6.8 | −7.1 |

Discussion

As shown in Table 4, the tensile strength retention of Examples 19, 20, and 21 is high as relative to Examples 22, 23, and 24 when exposed to the operating environments with in the compressor.

Examples 25-30

The objective of these examples was to evaluate tensile strength and tensile strength changes relative to unexposed polymer molded samples before and after exposed to temperature (127 degrees Celsius), lubricant (10cst, 32cst), Refrigerant (R134A, T410A and combination of them) at 127 degrees Celsius for a period of 30 Days.

Summary of Examples 25-30

| Example | Material Used | Material Description |
|---|---|---|
| 25 | 1010 | Polyetherimide, supplied by SABIC under ULTEM 1010 resin grade |
| 26 | CRS5001 | Polyetherimide, supplied by SABIC under ULTEM CRS5001 resin grade |
| 27 | DH1004 | Polyetherimide Blends, supplied by SABIC under ULTEM DH1004 resin grade |
| 28 | ULTEM/PPS | Supplied by SABIC polyetherimicie/polyphenolsulfone blend. It's a blend ULTEM1010 resin and Polyphynelene Sulphide (PPS supplied by Ticona)-ULTEM 1010 in the range of 50-70 wt % and PPS in the range of 50 to 30 wt % |
| 29 | Stanyl | High Temperature Nylon resin grade supplied by DSM |
| 30 | Amodel | High Temperature Polypthalamide (PPA) resin grade supplied by Amodel |

Experimental Details

Injection molded samples (Type V, ASTM standard bars) in the form of tensile bars were molded under standard molding conditions. These samples were tested on an Instron tensile testing machine at 0.2 inch/min displacement rate as per ASTM Standard testing protocol. Table 5 summarizes tensile strength data (Mpa) after exposure to different environments at 127 degrees Celsius.

TABLE 5

| Operating Conditions | Ex. 25 | Ex. 26 | Ex. 27 | Ex. 28 | Ex. 29 | Ex. 30 |
|---|---|---|---|---|---|---|
| As molded | 106.33 | 95.18 | 97.14 | 76.86 | 72.29 | 73.11 |
| $N_2$ Operating Environment at 127° C. | 135.02 | 113.72 | 117.36 | 53.83 | 31.49 | 37.55 |
| 10 CST Lubricant at 127° C. | 118.47 | 87.58 | 113.03 | 29.15 | 39.45 | 30.06 |
| 32 cst Lubricant at 127° C. | 126.40 | 100.57 | 103.67 | 73.21 | 41.15 | 28.43 |
| R410A + 32 cst + 300 psi Combinations at 127° C. | 104.87 | 81.45 | 106.79 | 57.63 | 66.45 | 76.27 |
| R410A-10 cst + 300 psi Combinations at 127° C. | 123.66 | 103.08 | 111.49 | 75.15 | 14.25 | 78.05 |

Examples 31-36

The objective of these examples was to evaluate tensile strength and tensile strength changes relative to unexposed polymer molded samples before and after exposed to temperature (127 degrees Celsius), lubricant (10cst, 32cst), Refrigerant (R134A, T410A and combination of them) at 127 degrees Celsius for a period of 30 Days.

Summary of Examples 31-36

| Example | Material Used | Material Description |
|---|---|---|
| 31 | 1010 | Polyetherimide, supplied by SABIC under ULTEM 1010 resin grade |
| 32 | CRS5001 | Polyetherimide, supplied by SABIC under ULTEM CRS5001 resin grade |
| 33 | DH1004 | Polyetherimide Blends, supplied by SABIC under ULTEM DH1004 resin grade |
| 34 | ULTEM/PPS | Supplied by SABIC polyetherimide/polyphenolsulfone blend. It's a blend ULTEM1010 resin and Polyphynelene Sulphide (PPS supplied by Ticona)-ULTEM 1010 in the range of 50-70 wt % and PPS in the range of 50 to 30 wt % |
| 35 | Stanyl | High Temperature Nylon resin grade supplied by DSM |
| 36 | Amodel | High Temperature Polypthalamide (PPA) resin grade supplied by Amodel |

Experimental Details

Injection molded samples (Type V, ASTM standard bars) in the form of tensile bars were molded under standard molding conditions. These samples were tested on an Instron tensile testing machine at 0.2 inch/min displacement rate as per ASTM Standard testing protocol. Table 6 summarizes data for tensile strength (Mpa) after exposure to different environments at 127 degrees Celsius.

TABLE 6

| Operating Conditions | Ex. 31 | Ex. 32 | Ex. 33 | Ex. 34 | Ex. 35 | Ex. 36 |
|---|---|---|---|---|---|---|
| As molded | 0.00 | 0.00 | 0.00 | 0.00 | 0.00 | 0.00 |
| $N_2$ Operating Environment at 127° C. | 26.99 | 19.49 | 20.82 | −29.96 | −56.45 | −48.64 |
| 10 CST Lubricant at 127° C. | 11.42 | −7.98 | 16.36 | −62.08 | −45.43 | −58.88 |
| 32 cst Lubricant at 127° C. | 18.88 | 5.66 | 6.72 | −4.75 | −43.09 | −61.11 |
| R410A + 32 cst + 300 psi Combinations at 127° C. | −1.37 | −14.42 | 9.94 | −25.02 | −8.08 | 4.32 |
| R410A + 10 cst + 300 psi Combinations at 127° C. | 16.30 | 8.30 | 14.78 | −2.22 | −80.28 | 6.76 |

Discussion

Examples 24-29 show the tensile strength measured after exposure to temperature, lubricants, refrigerants and combination of them. Retention of tensile properties is important for mechanical performance.

Examples 30-32 show a decrease in tensile strength of less than 10%, with respect to unexposed conditions, indicating stability of the injection polymers, whereas for examples 33-35 the decrease in tensile strength can be as large as 30%. This decrease in tensile strength is consistent with the observed changes in color of the tensile samples indicating chemistry changes in the following examples.

Examples 37-42

The object of these examples was to visually rate the observation of changes to color and deterioration of the sample after exposure to various operating conditions including temperature of 60° C. for thirty days. A qualitative rating of 1 for retention of property and 10 being the worst retention or deterioration of color.

Summary of Examples 37-42

| Example | Material Used | Material Description |
|---|---|---|
| 37 | 1010 | Polyetherimide, supplied by SABIC under ULTEM 1010 resin grade |
| 38 | CRS5001 | Polyetherimide, supplied by SABIC under ULTEM CRS5001 resin grade |
| 39 | DH1004 | Polyetherimide Blends, supplied by SABIC under ULTEM DH1004 resin grade |
| 40 | ULTEM/PPS | Supplied by SABIC polyetherimide/polyphenolsulfone blend. It's a blend ULTEM1010 resin and Polyphynelene Sulphide (PPS supplied by Ticona)-ULTEM 1010 in the range of 50-70 wt % and PPS in the range of 50 to 30 wt % |
| 41 | Stanyl | High Temperature Nylon resin grade supplied by DSM |
| 42 | Amodel | High Temperature Polypthalamide(PPA) resin grade supplied by Amodel |

Table 7 summarizes the qualitative rating of 1 for retention of property and 10 being the worst retention or deterioration of color upon exposure to various conditions.

TABLE 7

| Operating Conditions | Ex. 37 | Ex. 38 | Ex. 39 | Ex. 40 | Ex. 41 | Ex. 42 |
|---|---|---|---|---|---|---|
| As Molded | 1 | 1 | 1 | 1 | 1 | 1 |
| N₂ Operating Environment at 60° C. | 1 | 1 | 1 | 1 | 6 | 6 |
| 10 CST Lubricant at 60° C. | 1 | 1 | 1 | 1 | 10 | 10 |
| 32 CST Lubricant at 60° C. | 1 | 1 | 1 | 1 | 4 | 8 |
| R410A Refrigerant at 60° C. | 1 | 1 | 1 | 1 | 2 | 2 |
| R134A Refrigerant at 60° C. | 1 | 1 | 1 | 1 | 2 | 2 |
| R410A + 10 CST + 300 psi Combinations at 60° C. | 1 | 1 | 2 | 1 | 2 | 2 |

Figure 8:
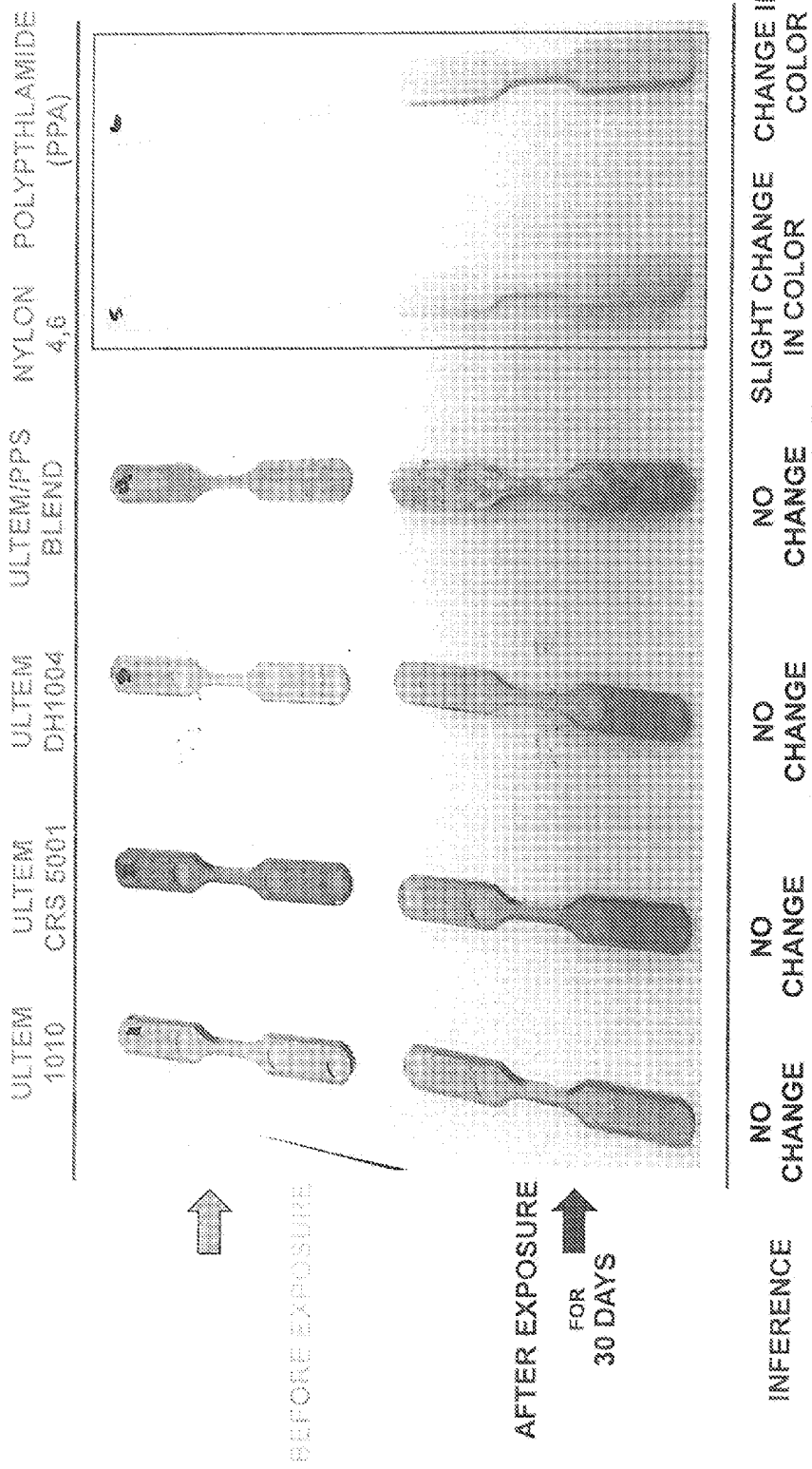

FIG. 8 is a photograph of the test samples in Examples 37-42 before exposure and after exposure for thirty days under inert atmosphere (N₂) at 60° C.

Figure 10:
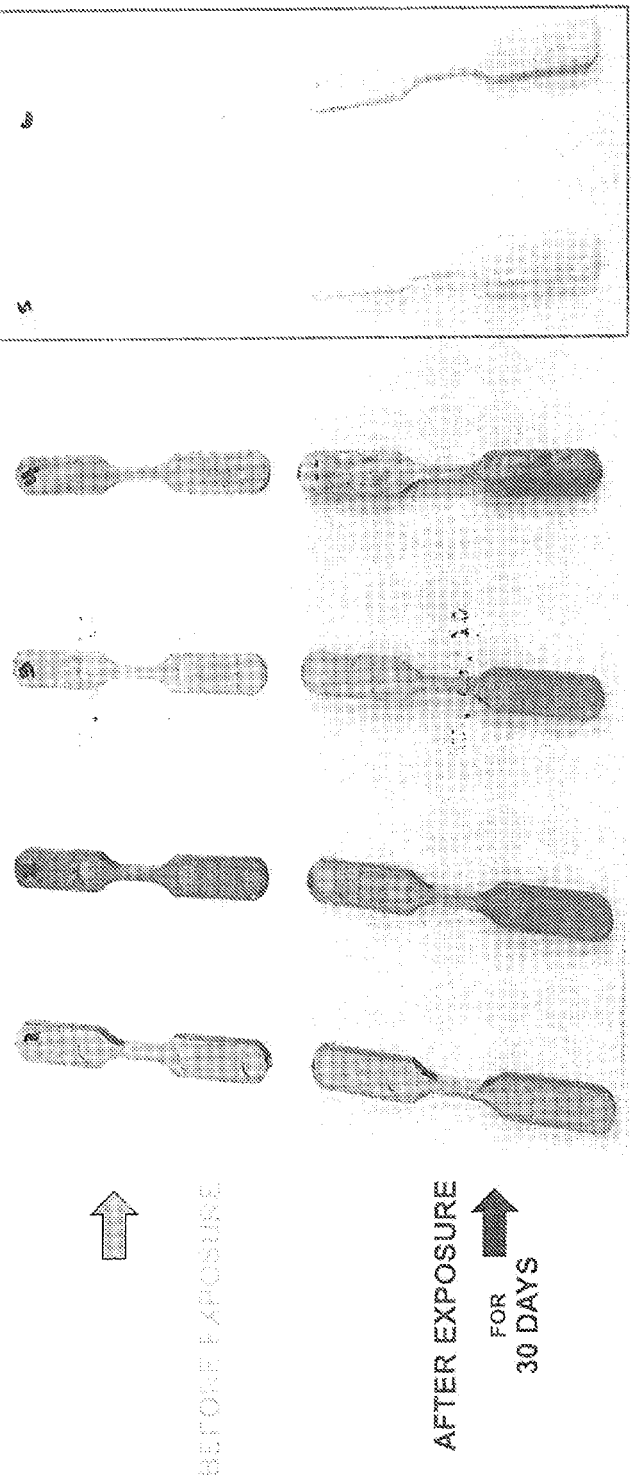

FIG. 10 is a photograph of the test samples in Examples 37-42 before exposure and after exposure to the lubricant 10 CST for thirty days at 60° C.

Figure 12:
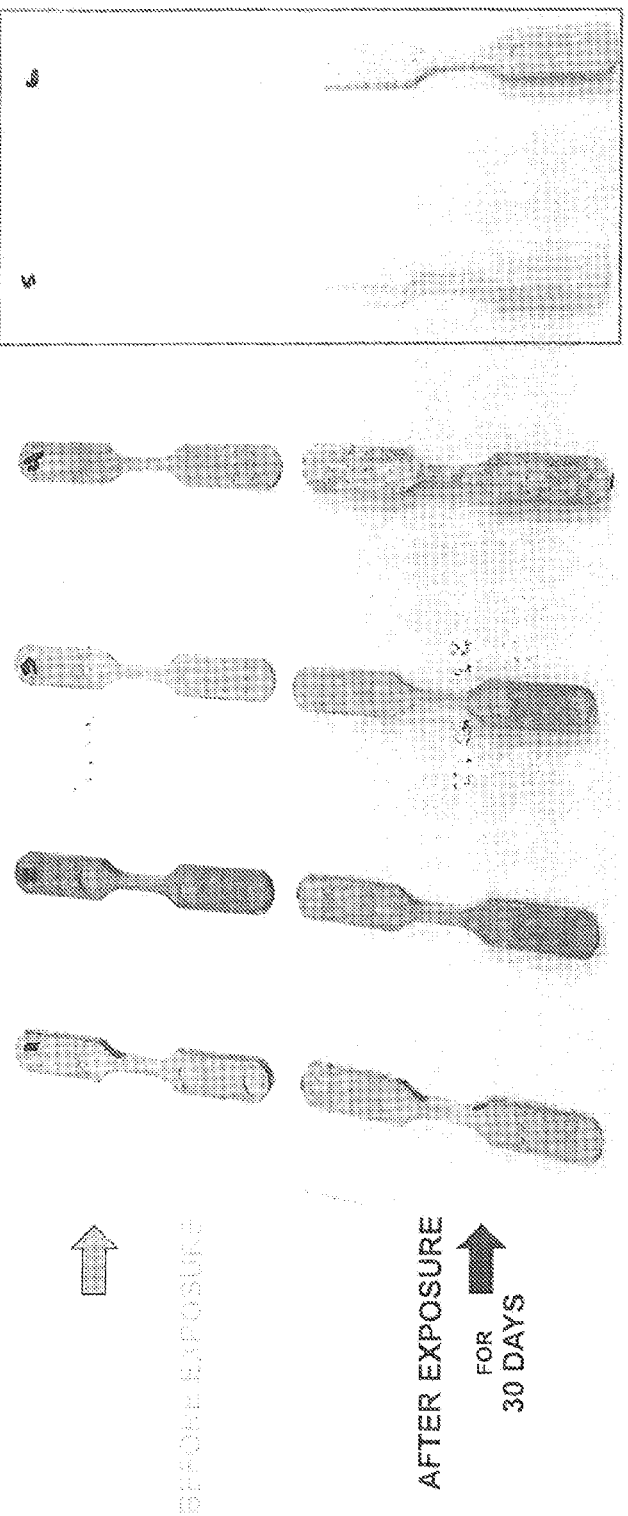

FIG. 12 is a photograph of the test samples in Examples 37-42 before exposure and after exposure to the lubricant 32 CST for thirty days at 60° C.

FIG. 14 is a photograph of the test samples in Examples 37-42 before exposure and after exposure to the refrigerant R134A for thirty days at 60° C.

Figure 15:
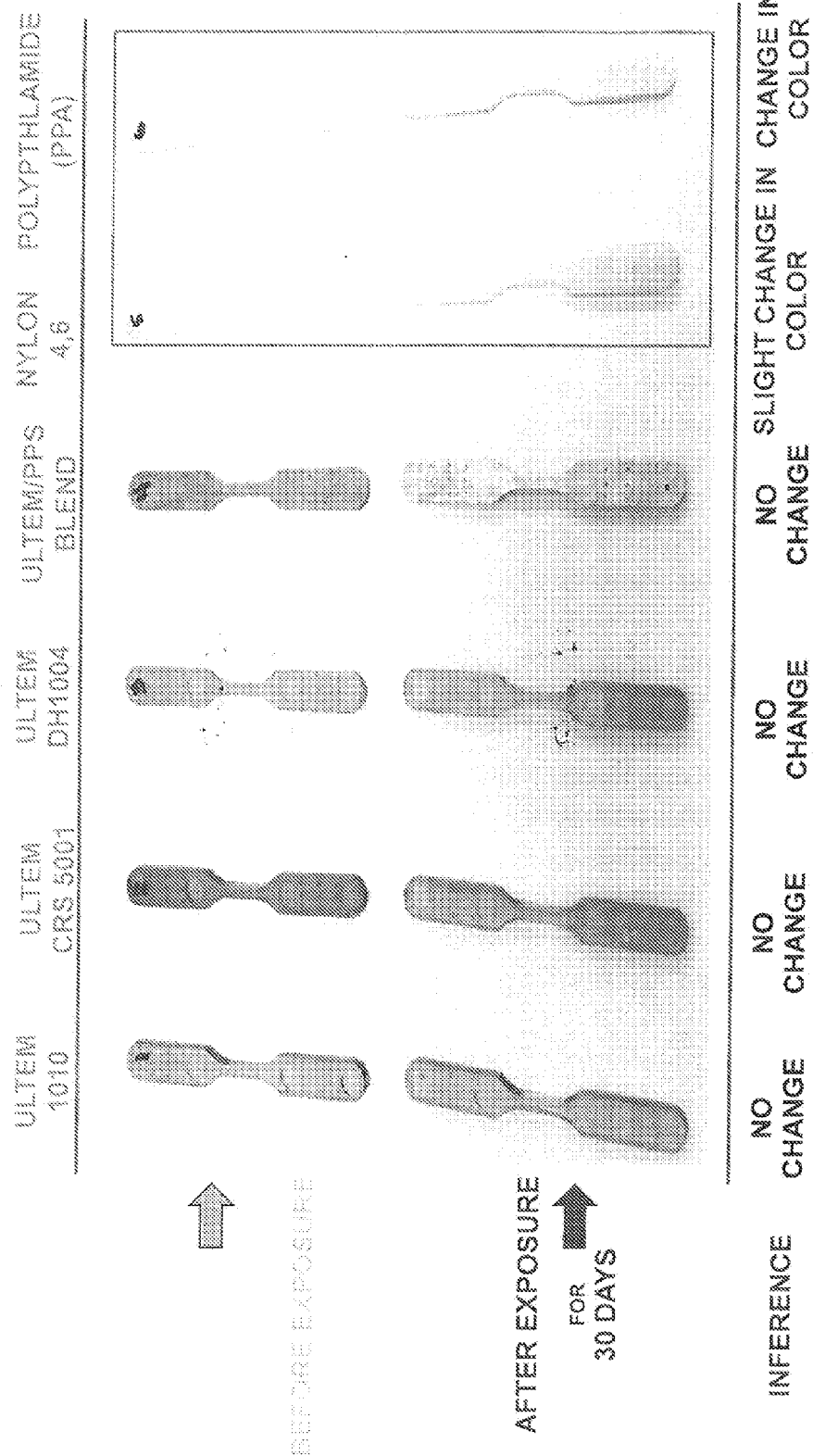

FIG. 15 is a photograph of the test samples in Examples 37-42 before exposure and after exposure to the refrigerant R 410A for thirty days at 60° C.

Figure 17:
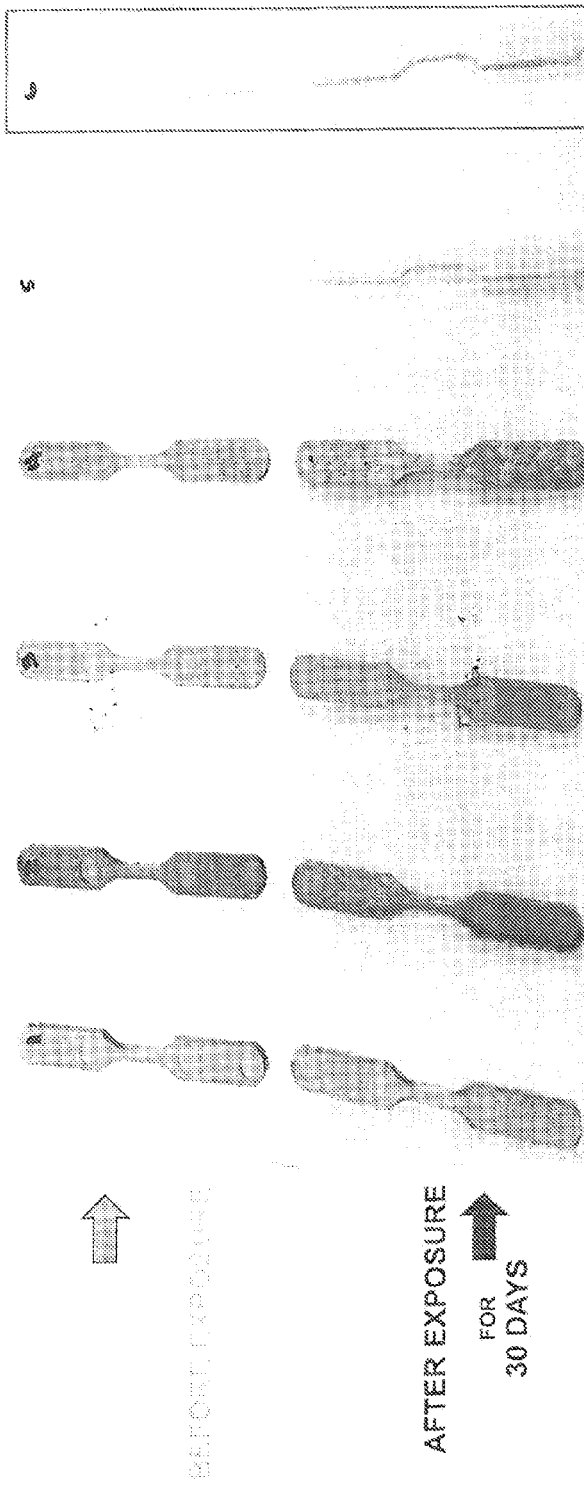

FIG. 17 is a photograph of the test samples in Examples 37-42 before exposure and after exposure to the conditions of a compressor environment with refrigerant R 410A+lubricant 10 CST at pressures of 300 psi for thirty days at 60° C.

Examples 43-48

The object of these examples was to visually rate the observation of changes to color and deterioration of the sample after exposure to various operating conditions, including a temperature of 127° C. for thirty days. A qualitative rating of 1 for retention of property and 10 being the worst retention or Summary of Examples 43-48

| Example | Material Used | Material Description |
|---|---|---|
| 43 | 1010 | Polyetherimide, supplied by SABIC under ULTEM 1010 resin grade |
| 44 | CRS5001 | Polyetherimide, supplied by SABIC under ULTEM CRS5001 resin grade |
| 45 | DH1004 | Polyetherimide Blends, supplied by SABIC under ULTEM DH1004 resin grade |
| 46 | ULTEM/PPS | Supplied by SABIC polyetherimide/polyphenolsulfone blend. It's a blend ULTEM1010 resin and Polyphynelene Sulphide (PPS supplied by Ticona)-ULTEM 1010 in the range of 50-70 wt % and PPS in the range of 50 to 30 wt % |
| 47 | Stanyl | High Temperature Nylon resin grade supplied by DSM |
| 48 | Amodel | High Temperature Polypthalamide (PPA) resin grade supplied by Amodel |

Table 8 summarizes the qualitative rating of 1 for retention of property and 10 being the worst retention or deterioration of color upon exposure to various conditions.

TABLE 8

| Operating Conditions | Ex. 43 | Ex. 44 | Ex. 45 | Ex. 46 | Ex. 47 | Ex. 48 |
|---|---|---|---|---|---|---|
| As Molded | 1 | 1 | 1 | 1 | 1 | 1 |
| N₂ Operating Environment at 127° C. | 1 | 1 | 1 | 1 | 10 | 10 |
| 10 CST Lubricant at 127° C. | 1 | 1 | 1 | 1 | 8 | 10 |
| 32 cst Lubricant at 127° C. | 1 | 1 | 1 | 1 | 6 | 10 |
| R410A + 32 CST + 300 psi Combinations at 127° C. | 1 | 1 | 1 | 1 | 3 | 4 |
| R410A + 10 CST + 300 psi Combinations at 127° C. | 1 | 1 | 1 | 1 | 3 | 3 |

Figure 9:
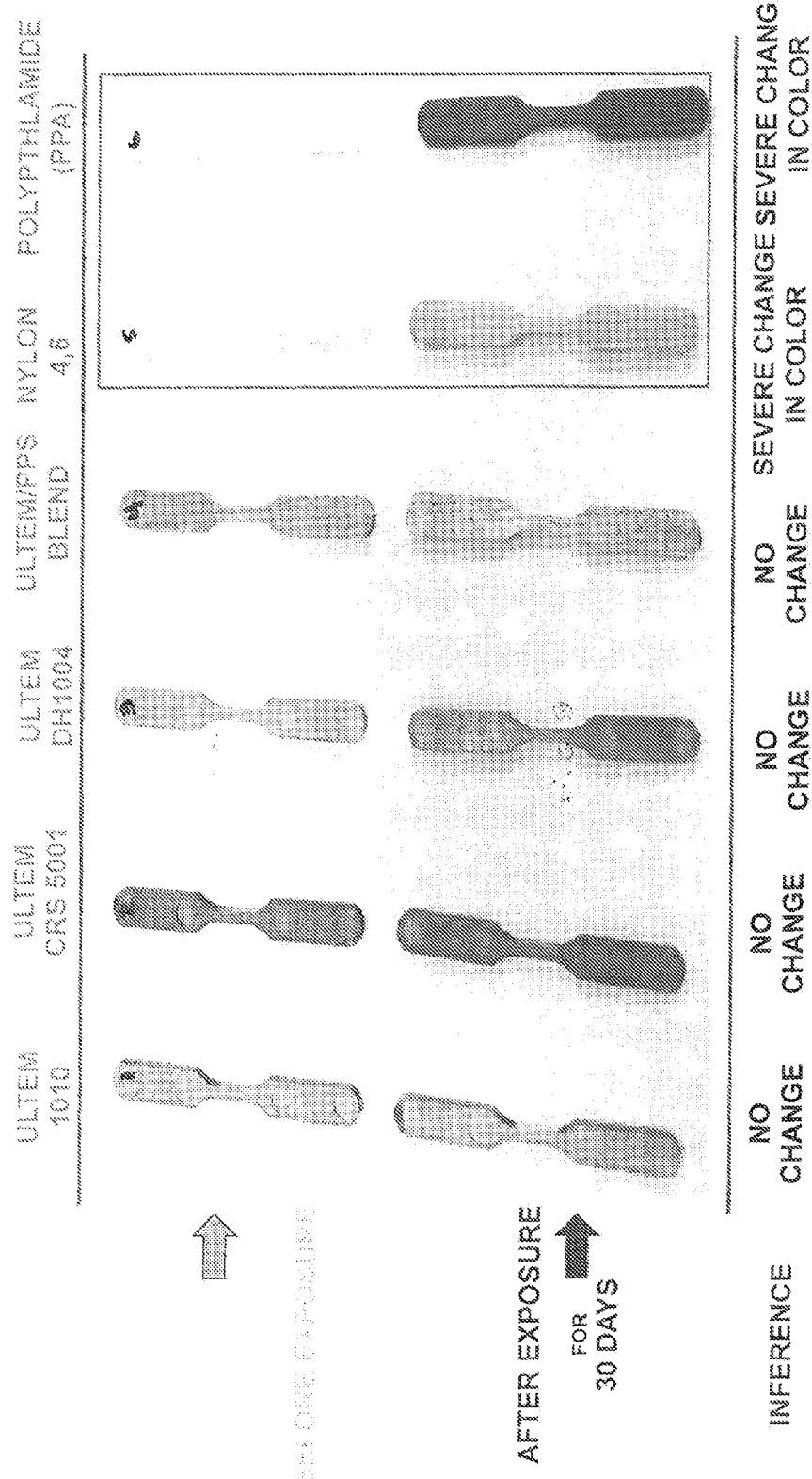

FIG. 9 is a photograph of the test samples in Examples 43-48 before exposure and after exposure for thirty days under inert atmosphere (N₂) at 127° C.

Figure 11:
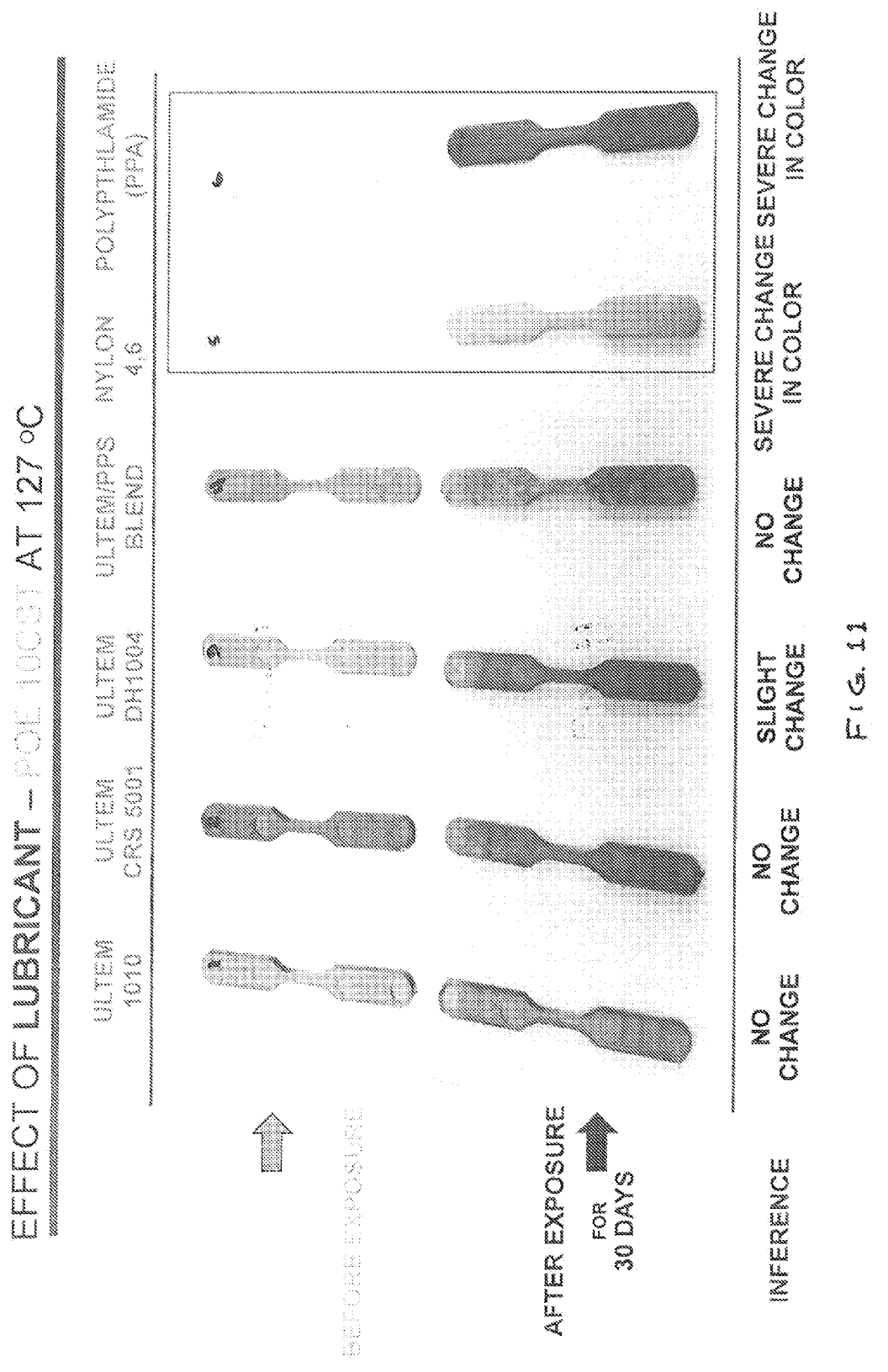

FIG. 11 is a photograph of the test samples in Examples 43-48 before exposure and after exposure to the lubricant 10 CST for thirty days at 127° C.

Figure 13:
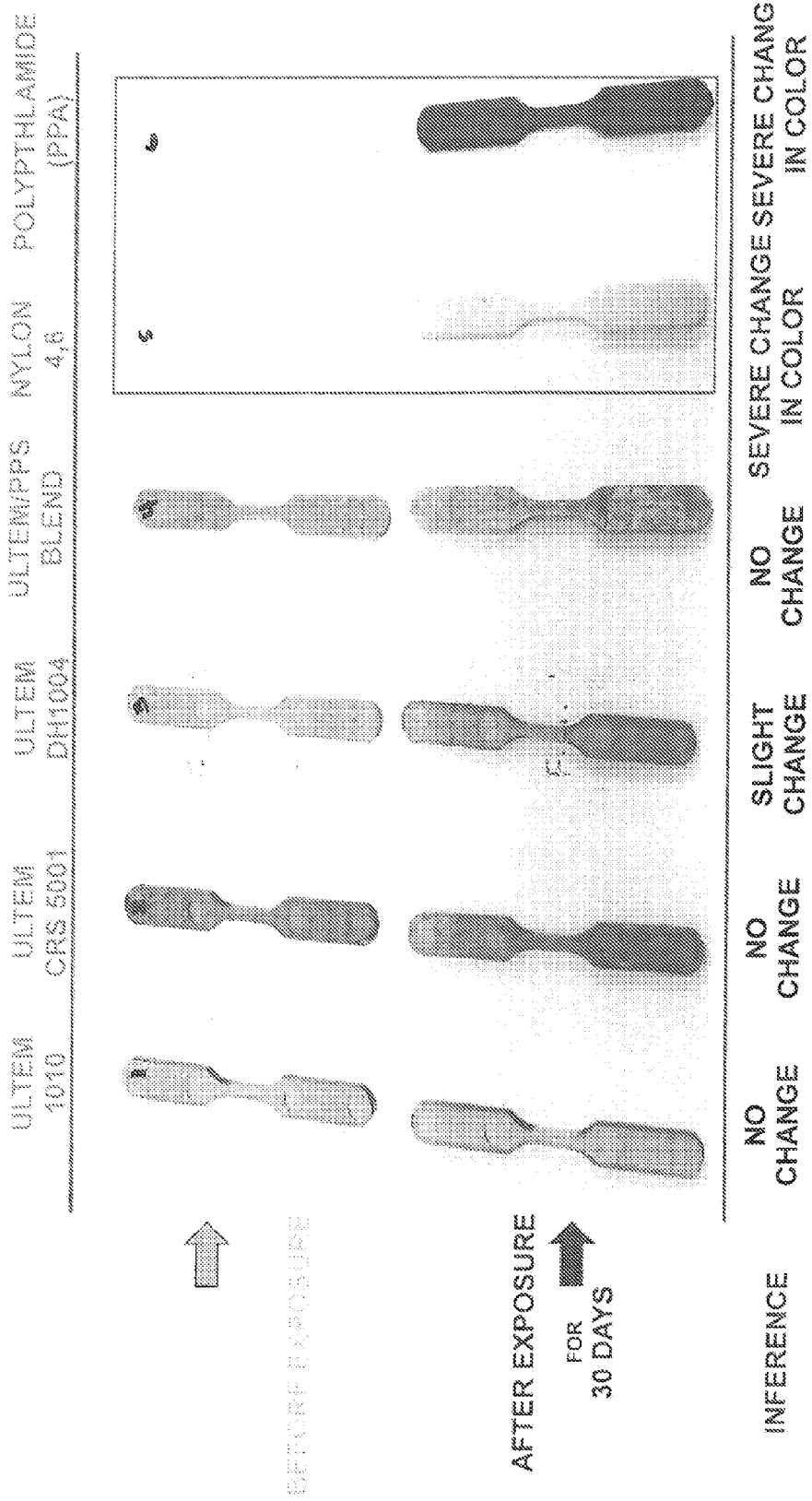
Figure 44:
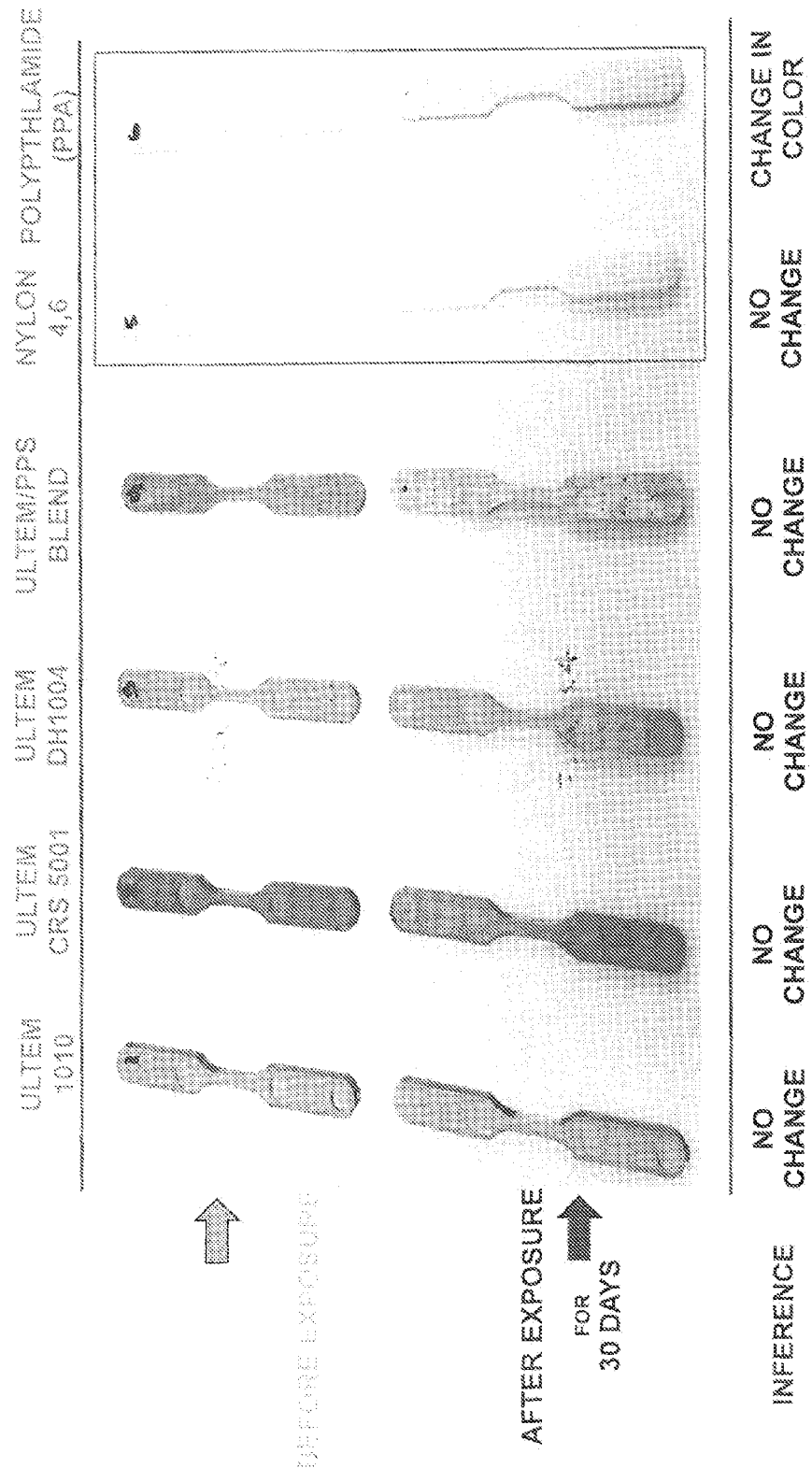

FIG. 13 is a photograph of the test samples in Examples 43-48 before exposure and after exposure to the lubricant 32 CST for thirty days at 127° C.

Figure 16:
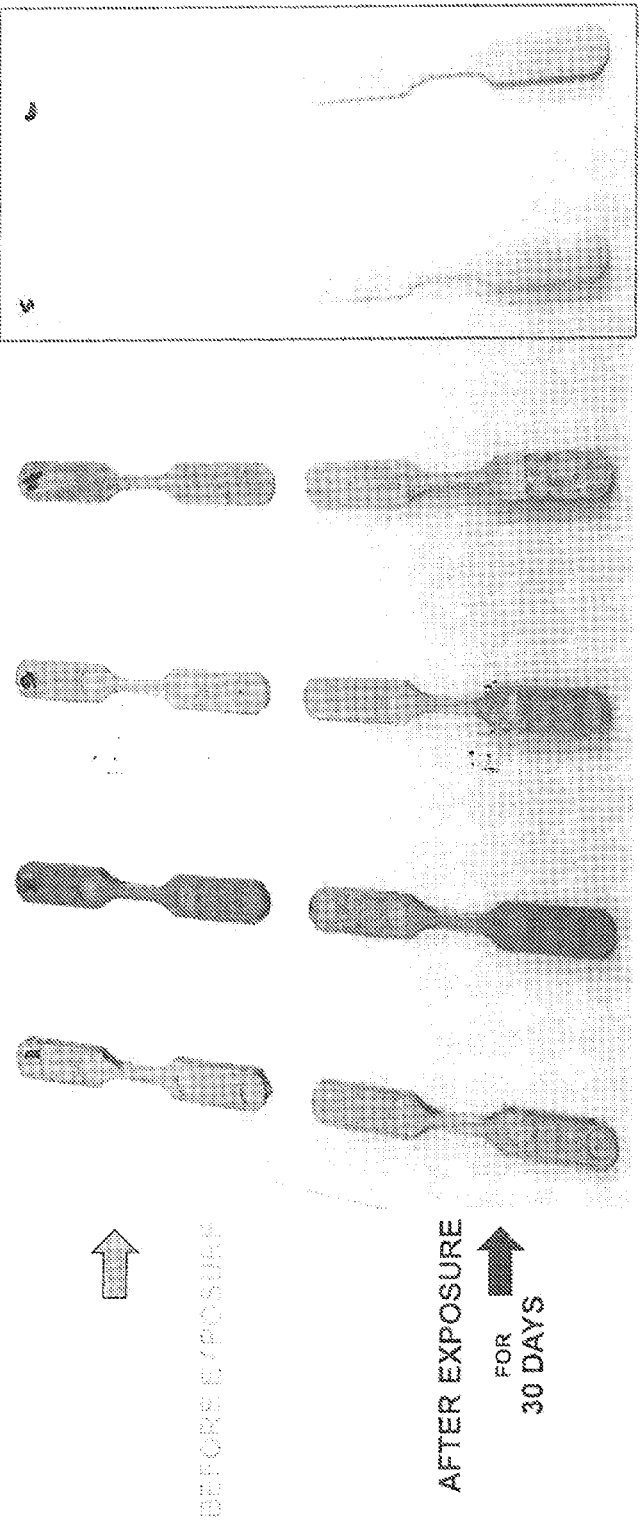

FIG. 16 is a photograph of the test samples in Examples 43-48 before exposure and after exposure to the conditions of a compressor environment with refrigerant R 410A+lubricant 32 CST at pressures of 300 psi for thirty days at 127° C.

Figure 18:
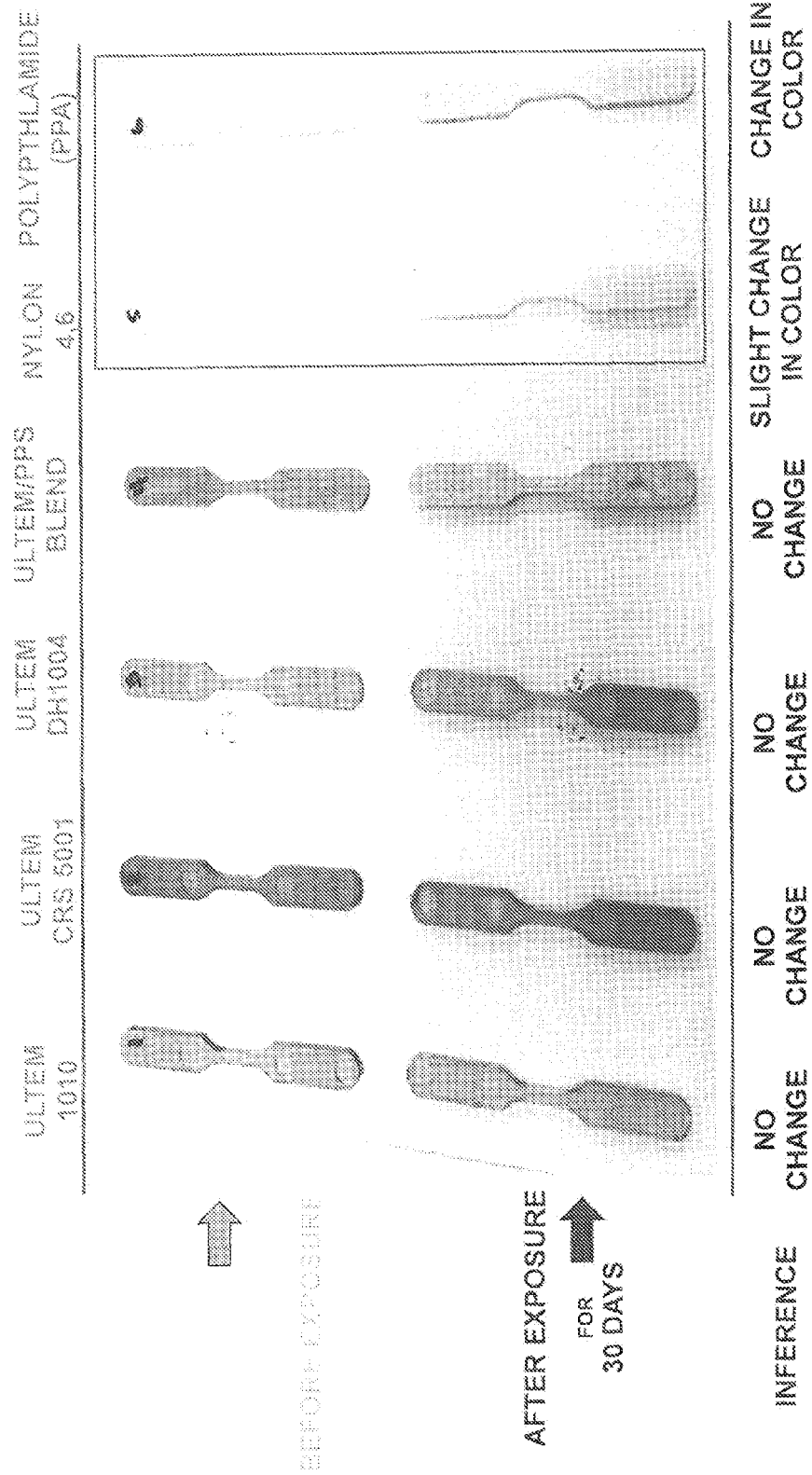

FIG. 18 is a photograph of the test samples in Examples 43-48 before exposure and after exposure to the conditions of a compressor environment with refrigerant R 410A+lubricant 10 CST at pressures of 300 psi for thirty days at 127° C.

Examples 49-54

The objective of these examples was to demonstrate improved barrier performance, specifically the permeability, of 1010 and glass filled 1010 to refrigerants R134A and R410A by a metallization technique.

Summary of Examples

| Example | Material Used | Material Description |
|---|---|---|
| 49 | 1010 | Polyetherimide, supplied by SABIC under ULTEM 1010 resin grade |
| 50 | 1010 + Al Metal Coated Layer | Polyetherimide, supplied by SABIC under ULTEM 1010 resin grade |
| 51 | 1010 + BaseCoat Layer + Al Metal Coated Layer | Polyetherimide supplied by SABIC under ULTEM 1010 resin grade |
| 52 | 2310 | Polyetherimide, supplied by SABIC under ULTEM 2310 resin grade |
| 53 | 2310 + Al Metal Coated Layer | Polyetherimide, supplied by SABIC under ULTEM 1010 resin grade |
| 54 | 2310 + BaseCoat Layer + Al Metal Coated Layer (Invention) | Polyetherimide, supplied by SABIC under ULTEM 2310 resin grade |

Experimental

The circular specimens of ULTEM and glass filled ULTEM were sputter coating with Aluminum metal as metal coating layer. The samples were mounted on a sputter unit and coating thickness of 60 nm to 180 nm was achieved.

To improve the adhesion between the polymer substrate and Metal Layer a base coat of 25 microns was applied onto polymer substrate before the metallization was carried out. The permeability measurements were carried out on these samples. The results are summarized in Table 9, which shows the permeability in $scc*cm/s/cm^2/Pa$.

TABLE 9

| Operating Conditions | Ex. 49 | Ex. 50 | Ex. 51 | Ex. 52 | Ex. 53 | Ex. 54 |
|---|---|---|---|---|---|---|
| R410A Refrigerant at 120° C. | 1.2781E−12 | 7.3133E−12 | 3.7829E−11 | 5.1291E−11 | 1.7081E−11 | 2.1481E−11 |
| R134A Refrigerant at 60° C. | 1.0952E−11 | 8.2890E−12 | 4.5988E−12 | 1.6580E−10 | 4.8178E−11 | 1.4365E−11 |
| R134A Refrigerant at 120° C. | 8.4208E−13 | 8.5112E−13 | 4.0072E−12 | 1.2898E−07 | 9.7750E−13 | 3.1944E−12 |

Results

Examples where a metal coating is applied to reinforced polyetherimide show lower permeability as compared to un-metallized reinforced polyetherimide.

Leaching Studies

Objective:

To determine if low mol. Wt species diffused out of polymer into lubricants when exposed to lubricant at 60° C. and 127° C.

Results

The lubricant samples were analysed for organic compound and polymers for less than or equal to 10 ppm using GCMS technique.

The GCMS technique detected no low molecular weight species (F542, PAMI), in the lubricant within 10 ppm level of detection.

Original Example from Provisional Application

Purpose:

In support of our thermoplastic compressor application development efforts, the 'upper scroll' component from a teardown sample was selected to replicate in thermoplastic for demonstration purposes. This component is currently machined from steel stock.

| MATERIAL | description | SOURCE |
|---|---|---|
| Ultem 9085 | POLYETHERIMIDE | SABIC INNOVATIVE PLASTICS |

Techniques for 3-D Printing/Additive Manufacturing & Procedures

To replicate a steel upper scroll component in the conventional method, a steel tool would have to be cut which is then used to produce parts using an injection molding process. A different approach was however used to make the scroll component. The thermoplastic replicates in this case were built using additive manufacturing principles where in layer upon layer of the thermoplastic material is deposited to create a complete part. The particular technique utilized here is called Fused Deposition Molding developed by Stratasys Inc.

Figure 7:
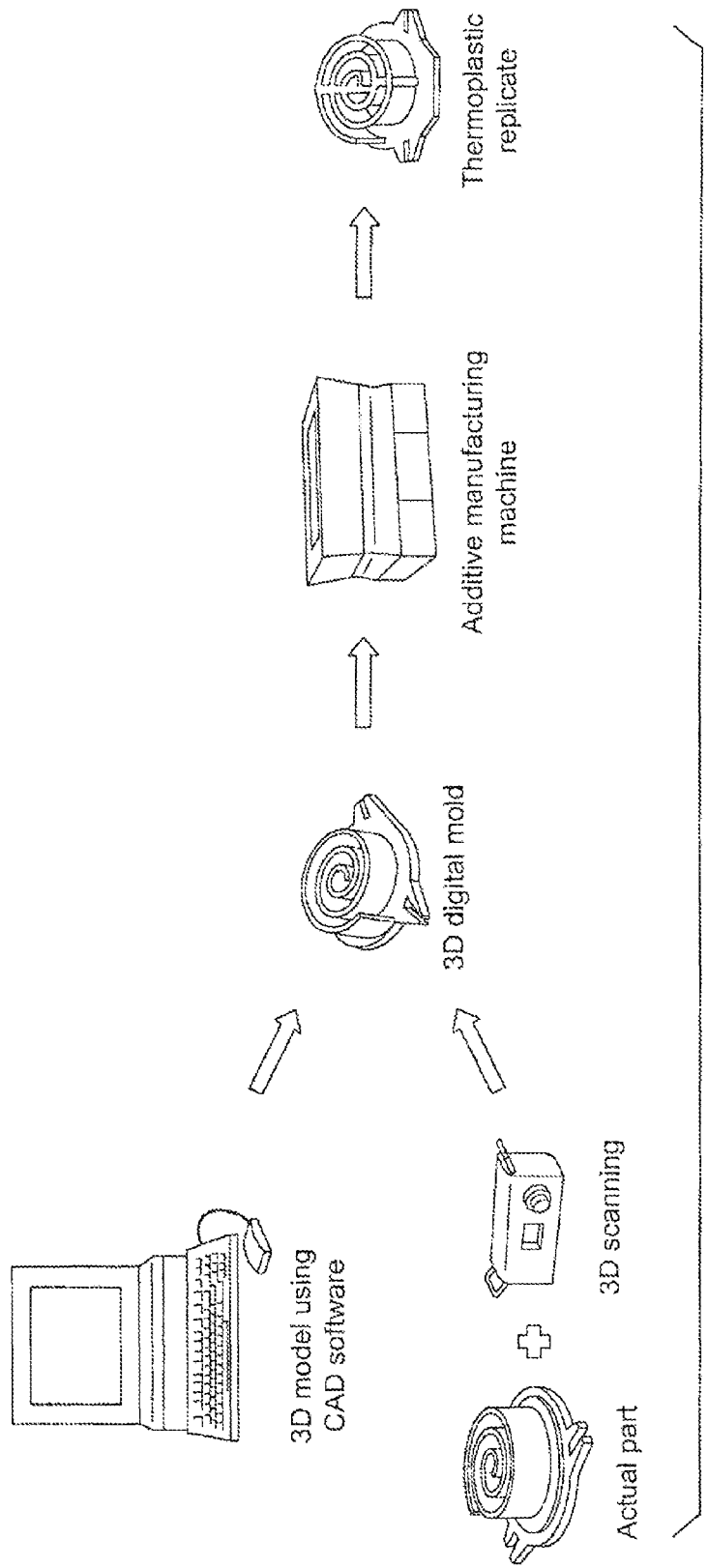

To enable the additive process, a 3D digital CAD model of the part is required as the input to the machine. This can be generated from scratch by modeling the part using CAD design softwares or reverse engineered from an actual part using 3D scanners. A 3D scanner is a device that analyzes a real-world object or environment to collect data on its shape and possibly its appearance (i.e. color). The collected data can then be used to construct digital 3D models. A flow chart of this process is illustrated in FIG. 7.

To replicate the steel upper scroll component in a thermoplastic resin, it was first necessary to generate a three dimensional model of the existing application. A laser scanning process was used to create the mathematical model of the test component.

To create the actual thermoplastic sample, Stratasys Incorporated's 'Fused Deposition Modeling' (FDM) technology was utilized. This is an additive process where the model is built layer upon layer until completed.

The model was made using ULTEM* 9085 resin with extruded layer thickness of about 0.010 inches.

More particularly, the steel upper scroll component was made in an extrusion-based digital manufacturing system as follows. A consumable filament of polyetherimide sold commercially as Ultem 9085 resin, manufactured and sold by SABIC Innovative Plastics, US LLC, was provided to an extrusion-based digital manufacturing system purchased from Stratysys, Inc and known as FORTUS™-400 mc. This system is described in U.S. Pat. No. 8,236,227, the entire disclosure of which is herein incorporated by reference.

The consumable filament had a length, an exterior surface, and a plurality of tracks along at least a portion of the length, such that the plurality of tracks provided a fractal dimensionality for at least a portion of the exterior surface that is greater than two for a length scale between 0.01 millimeters and 1.0 millimeter. The teeth of a rotatable drive mechanism retained by the extrusion-based digital manufacturing system engaged with a rotatable drive mechanism with the plurality of tracks of the consumable filament. Portions of the consumable filament were fed successively with the rotatable drive mechanism to a liquefier retained by the extrusion-based digital manufacturing system. Successive teeth of the rotatable drive mechanism were continuously engaged with successive tracks of the plurality of tracks while feeding the successive portions of the consumable filament. The consumable filament melted in the liquefier to provide a melted consumable material. The melted consumable material from the liquefier was extruded and the extruded consumable material was deposited in a layer-by-layer manner to form the steel upper scroll component In embodiments where additive manufacturing techniques are used to make compressing members, our compressing members can be made by any suitable process that uses additive manufacturing strategies. In one embodiment, our invention includes a method for building a three-dimensional compressing member in an extrusion-based digital manufacturing system, the method comprising: providing a consumable filament of the polymeric material to the extrusion-based digital manufacturing system, the consumable filament having a length, an exterior surface, and a plurality of tracks along at least a portion of the length, wherein the plurality of tracks provide a fractal dimensionality for at least a portion of the exterior surface that is greater than two for a suitable length scale, e.g., a length scale between 0.01 millimeters and 1.0 millimeter; engaging teeth of a rotatable drive mechanism retained by the extrusion-based digital manufacturing system with the plurality of tracks of the consumable filament; feeding successive portions of the consumable filament with the rotatable drive mechanism to a liquefier retained by the extrusion-based digital manufacturing system, wherein successive teeth of the rotatable drive mechanism are continuously engaged with successive tracks of the plurality of tracks while feeding the successive portions of the consumable filament; melting the consumable filament in the liquefier to provide a melted consumable material; extruding the melted consumable material from the liquefier; and depositing the extruded consumable material in a layer-by-layer manner to form at least a portion of the compressing member, which can generate back pressure in the liquefier. The consumable filament can be made by any suitable geometry. In one embodiment, the consumable filament has a substantially cylindrical geometry with an average diameter ranging from about 1.143 millimeters to about 2.54 millimeters. In another embodiment, the consumable filament has a substantially rectangular cross-sectional profile. The plurality of tracks can be selected from the group consisting of rectangular tracks, parabolic tracks, worm-type tracks, corrugated tracks, textured tracks, impressed file-type tracks, herringbone-type tracks, sprocket tracks, edge-facing tracks, staggered tracks, and combinations thereof.

Results

An upper scroll component of a compressing member of a compressor was made in accordance to the procedure that was described above.

A polyetherimide upper scroll component was fabricated. The upper scroll component had the following dimensions: approximately 5½" diameter×3" tall. This one-for-one replication of a steel component in thermoplastic provides a physical sample to demonstrate weight savings that could be achieved by changing from metal to ULTEM resin. For an actual thermoplastic application, design modifications would be required to meet strength requirements in accordance with thermoplastic design principles, including radii, draft and wall thickness uniformity. The fiber orientation in the part printed can be selected to have maximum strength in the sections requiring greater mechanical performance.

The polyetherimide scroll is expected to retain at least 90% of its tensile strength after being exposed to the mixture of lubricants and refrigerants for 30 days. The polyetherimide scroll is also expected to exhibit a creep of less than or equal to 10% after being exposed to the mixture of lubricants and refrigerants for 30 days when the component is exposed to a mixture of lubricants and refrigerants Samples made with a three dimensional printing process do not possess the same mechanical properties one could expect from an injection molded part of like geometry. The three dimensional printing process results in porosity on the finished part and, as a result, the finished product would have approximately 80% (maximum) of the strength of an injection molded part produced with the same resin.

Although we have described our invention with particular emphasis on scroll compressors, it should readily be appreciated by those skilled in the art to which this specification is directed, that the invention as described herein is applicable to other types of compressors, including reciprocating compressors comprising at least one component selected from the group consisting of housing, cap, crank case, valve plate, cylinder, cylinder head, piston, shaft support, shaft, and combinations thereof, which may be modified according to the teachings of the invention without departing from the spirit and scope of the invention.

Although the present invention has been described in considerable detail with reference to certain preferred versions thereof, other versions are possible.

Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

SCROLL COMPRESSOR LISTING OF REFERENCE NUMERALS

6 Electrical Connector
7 Low Pressure Intlet
8 Scroll Compressor
9 High Pressure Outlet
10 Scroll Compressor Housing
11 Upper Scroll
12 Scroll Compressor Cover
14 Motor
15 Support Collar
16 Guide
17 Spiral Scroll
19 Cap 20 Bearing
21 Polymeric Material Upper Scroll
25 Polymeric Material Support Collar
26 Polymeric Material Guide
27 Polymeric Material Upper Scroll
30 Polymeric Material Housing
31 Reinforcing Rib
32 Polymeric Material Cap
33 Polymeric Material Support
35 Low Pressure Inlet
36 Electrical Connector
37 Polymeric Material Collar
251 Square Locking Plugs
252 Reinforcing Ring All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A compressing member comprising: an element comprising a polymeric polyetherimide material selected from the group consisting of (i) silicone polyetherimides and (ii) silicone polyetherimides in combination with polyetherimide sulfones, which polymeric material retains at least 90% of its dimensions after being exposed to a mixture of at least one lubricant and at least one refrigerant for 30 days at temperatures of 60 degrees Celsius, wherein the polymeric material is configured to have at least one reinforcing shape selected from the group consisting of a rib, a boss, a flange, a hoop and combinations thereof.

2. The member of claim 1, wherein the element retains at least 85% of its tensile strength after being exposed to the mixture of lubricant and refrigerant for 30 days.

3. The member of claim 1, wherein the element exhibits a creep of less than or equal to 10% after being exposed to the mixture of lubricant and refrigerant for 30 days.

4. The member of Claim 1, wherein the element further comprises a filler selected from the group consisting of glass fibers, carbon fibers, and combinations thereof.

5. The member of claim 1, wherein the element is a scroll compressing member comprising a spiral configuration.

6. The member of claim 1, wherein the member additionally comprises a metal load bearing element.

7. The member of claim 6, wherein the metal is steel.

8. The member of claim 1, wherein the refrigerant is a hydrofluorocarbon.

9. The member of claim 1, wherein the lubricant is a polyalkylene glycol.

10. The member of claim 3, wherein a load of about 20MPa is present during the exposure to the mixture of lubricant and refrigerant.

11. The member of claim 1, wherein the refrigerant is one selected from the group consisting of R410A, R134A and combinations thereof.

12. The member of claim 1, wherein the polymeric material further comprises a crosslinked organic base coat.

13. A compressor comprising the compressing member of claim 1, further comprising a motor.

14. The compressor of claim 13, which is a scroll compressor.

15. A compressor, said compressor comprising:
(1) a motor element;
(2) a compressing member; wherein the compressing member comprising at least one component comprising a polymeric silicone polyetherimides, wherein the component retains at least 90% of its dimensions after being exposed to a mixture of at least one lubricant and at least one refrigerant for 30 days at 60° C.; wherein the polymeric material is a scroll compressing member comprising a spiral configuration and,
wherein the compressing member retains at least 85% of its tensile strength after being exposed to the mixture of lubricant and refrigerant for 30 days.

16. The compressor of claim 15, wherein the compressor further comprises a housing enclosing the motor element and the compressing member and wherein at least the housing is configured to have at least one reinforcing shape selected from the group consisting of a rib, a boss, a flange, a hoop and combinations thereof.

17. The compressor of claim 15, wherein the polymeric material is a composite.

18. The compressor of claim 15, wherein the compressor comprises a spiral scroll and an upper scroll, wherein the spiral scroll and the upper scroll have matching draft angles ranging from 0 to 10 degrees.

19. The compressing member of claim 1, wherein the polymeric material comprises (a) the polyetherimide material, and (h) a phosphorus-containing stabilizer, in an amount that is effective to increase the melt stability of the polyetherimide material, wherein the phosphorus-containing stabilizer exhibits a low volatility such that, as measured by thermogravimetric analysis of an initial amount of a sample of the phosphorus-containing stabilizer, greater than or equal to 10 percent by weight of the initial amount of the sample remains unevaporated upon heating of the sample from room temperature to 300° C. at a heating rate of a 20° C. per minute under an inert atmosphere.

20. The compressing member of claim 19, wherein the phosphorous-containing stabilizer has a formula P—R'a, where R' is independently H, alkyl, alkoxy, aryl, aryloxy, or oxy substituent and a is 3 or 4.

21. The compressor of claim 15, wherein the at least one component is selected from (a) the polyetherimide material, and (b) a phosphorus-containing stabilizer, in an amount that is effective to increase the melt stability of the polyetherimide material, wherein the phosphorus-containing stabilizer exhibits a low volatility such that, as measured by thermogravimetric analysis of an initial amount of a sample of the phosphorus-containing stabilizer, greater than or equal to 10 percent by weight of the initial amount of the sample remains unevaporated upon heating of the sample from room temperature to 300° C. at a heating rate of a 20° C. per minute under an inert atmosphere.

22. The compressor of claim 21, wherein the phosphorous-containing stabilizer has a formula P—R'a, where R' is independently H, alkyl, alkoxy, aryl, aryloxy, or oxy substituent and a is 3 or 4.

23. The compressing member of claim 1, wherein the compressing member is made in an extrusion-based digital manufacturing system, the method comprising:
providing a consumable filament of the polymeric material to the extrusion-based digital manufacturing system, the consumable filament having a length, an exterior surface, and a plurality of tracks along at least a portion of the length, wherein the plurality of tracks provide a fractal dimensionality for at least a portion of the exterior surface that is greater than two for a length scale between 0.01 millimeters and 1.0 millimeter;

engaging teeth of a rotatable drive mechanism retained by the extrusion-based digital manufacturing system with the plurality of tracks of the consumable filament;

feeding successive portions of the consumable filament with the rotatable drive mechanism to a liquefier retained by the extrusion-based digital manufacturing system, wherein successive teeth of the rotatable drive mechanism are continuously engaged with successive tracks of the plurality of tracks while feeding the successive portions of the consumable filament;

melting the consumable filament in the liquefier to provide a melted consumable material;

extruding the melted consumable material from the liquefier; and depositing the extruded consumable material in a layer-by-layer manner to form at least a portion of the compressing member.

24. The compressor of claim 15, wherein the compressing member of the compressor is made in an extrusion-based digital manufacturing system, the method comprising:

providing a consumable filament of the polymeric material to the extrusion based digital manufacturing system, the consumable filament having a length, an exterior surface, and a plurality of tracks along at least a portion of the length, wherein the plurality of tracks provide a fractal dimensionality for at least a portion of the exterior surface that is greater than, two for a length scale between 0.01 millimeters and 1.0 millimeter;

engaging teeth of a rotatable drive mechanism retained by the extrusion-based digital manufacturing system with the plurality of tracks of the consumable filament;

feeding successive portions of the consumable filament with the rotatable drive mechanism to a liquefier retained by the extrusion-based digital manufacturing system, wherein successive teeth of the rotatable drive mechanism are continuously engaged with successive tracks of the plurality of tracks while feeding the successive portions of the consumable filament;

melting the consumable filament in the liquefier to provide a melted consumable material;

extruding the melted consumable material from the liquefier; and depositing the extruded consumable material in a layer-by-layer manner to form at least a portion of the compressing member.

25. The member of claim 12, wherein the member further comprises a metal layer.

26. The member of claim 25, wherein the metal layer is selected from the group consisting of steels, irons, aluminum, chromium, copper, alloys of the foregoing, and combinations thereof.

27. The compressor of claim 16, wherein the housing additionally comprises a metal load bearing element in the at least one reinforcing shape.

* * * * *